(12) United States Patent
Mont-Reynaud

(10) Patent No.: US 11,463,663 B2
(45) Date of Patent: Oct. 4, 2022

(54) CAMERA GLASSES FOR LAW ENFORCEMENT ACCOUNTABILITY

(71) Applicant: MindGam3 Institute, Menlo Park, CA (US)

(72) Inventor: Jordy E. Mont-Reynaud, Menlo Park, CA (US)

(*) Notice: Subject to any disclaimer, the term of this patent is extended or adjusted under 35 U.S.C. 154(b) by 0 days.

(21) Appl. No.: 17/596,891

(22) PCT Filed: Jun. 22, 2020

(86) PCT No.: PCT/US2020/070165
§ 371 (c)(1),
(2) Date: Dec. 20, 2021

(87) PCT Pub. No.: WO2020/257827
PCT Pub. Date: Dec. 24, 2020

(65) Prior Publication Data
US 2022/0217308 A1      Jul. 7, 2022

Related U.S. Application Data

(60) Provisional application No. 62/865,886, filed on Jun. 24, 2019, provisional application No. 62/865,117, filed on Jun. 21, 2019.

(51) Int. Cl.
*H04N 7/18* (2006.01)
*H04N 5/225* (2006.01)
*H04N 5/232* (2006.01)

(52) U.S. Cl.
CPC .......... *H04N 7/188* (2013.01); *H04N 5/2252* (2013.01); *H04N 5/2257* (2013.01); *H04N 5/23219* (2013.01); *H04N 7/185* (2013.01)

(58) Field of Classification Search
CPC ...... G06F 3/0416; G06F 11/32; G06F 16/162; G06F 16/3326; G06F 16/337;
(Continued)

(56) References Cited

U.S. PATENT DOCUMENTS 10,679,190 B1 *  6/2020  Teller .................... H04W 12/06
2006/0227640 A1  10/2006  Herschaft et al.
(Continued)

OTHER PUBLICATIONS

PCT Search Report and Written Opinion for PCT/US2020/070165, dated Nov. 17, 2020, 13 pages.

*Primary Examiner* — Masum Billah
(74) *Attorney, Agent, or Firm* — NDWE LLP; Judith Szepsi

(57) ABSTRACT

A monitoring device comprising a frame usable as facewear, one or more cameras built into the frame, a cover attached to the frame that covers the camera when not in use, and a communication circuit for communicating the camera content to a remote server. In one embodiment the camera can be activated by gestures such as a hands-up gesture in which both hands are raised over the head, when the user is wearing gesture input nodes on their hands or wrists. The camera can alternately be activated by an audio cue or a wrist-worn base having an activation button so that the camera can be activated when the user is in hand restraints. In one embodiment, if the camera is suddenly inoperable or the monitoring device is removed from the user's face, remote wearable cameras on the user's person are activated to continue recording audio, video, or other content.

20 Claims, 19 Drawing Sheets

Use Case

(58) Field of Classification Search
CPC .. G06F 21/62; G06F 2221/2141; G06F 3/005; G06F 3/012; G06F 3/013
USPC ........................................................ 348/158
See application file for complete search history.

(56) References Cited

U.S. PATENT DOCUMENTS

| | | |
|---|---|---|
| 2008/0192114 A1 | 8/2008 | Pearson et al. |
| 2011/0148755 A1 | 6/2011 | Lee et al. |
| 2012/0249797 A1* | 10/2012 | Haddick ................ G04G 21/04 701/491 |
| 2012/0287284 A1* | 11/2012 | Jacobsen ................ G06F 3/012 345/419 |
| 2013/0084885 A1 | 4/2013 | Jain et al. |
| 2014/0282280 A1 | 9/2014 | Kim et al. |
| 2015/0084855 A1 | 3/2015 | Song et al. |
| 2016/0098138 A1 | 4/2016 | Park et al. |
| 2016/0112684 A1* | 4/2016 | Connor ................ G16H 20/60 356/402 |
| 2016/0202873 A1* | 7/2016 | Chi ........................ G06F 3/005 345/173 |
| 2016/0377891 A1* | 12/2016 | Abreu .................... G06F 3/167 348/158 |
| 2016/0378185 A1 | 12/2016 | Mody et al. |
| 2017/0214887 A1* | 7/2017 | Edwards .............. H04N 5/2256 |
| 2017/0231554 A1 | 8/2017 | Saito |
| 2018/0136465 A1* | 5/2018 | Chi ........................ G06F 3/0416 |

* cited by examiner

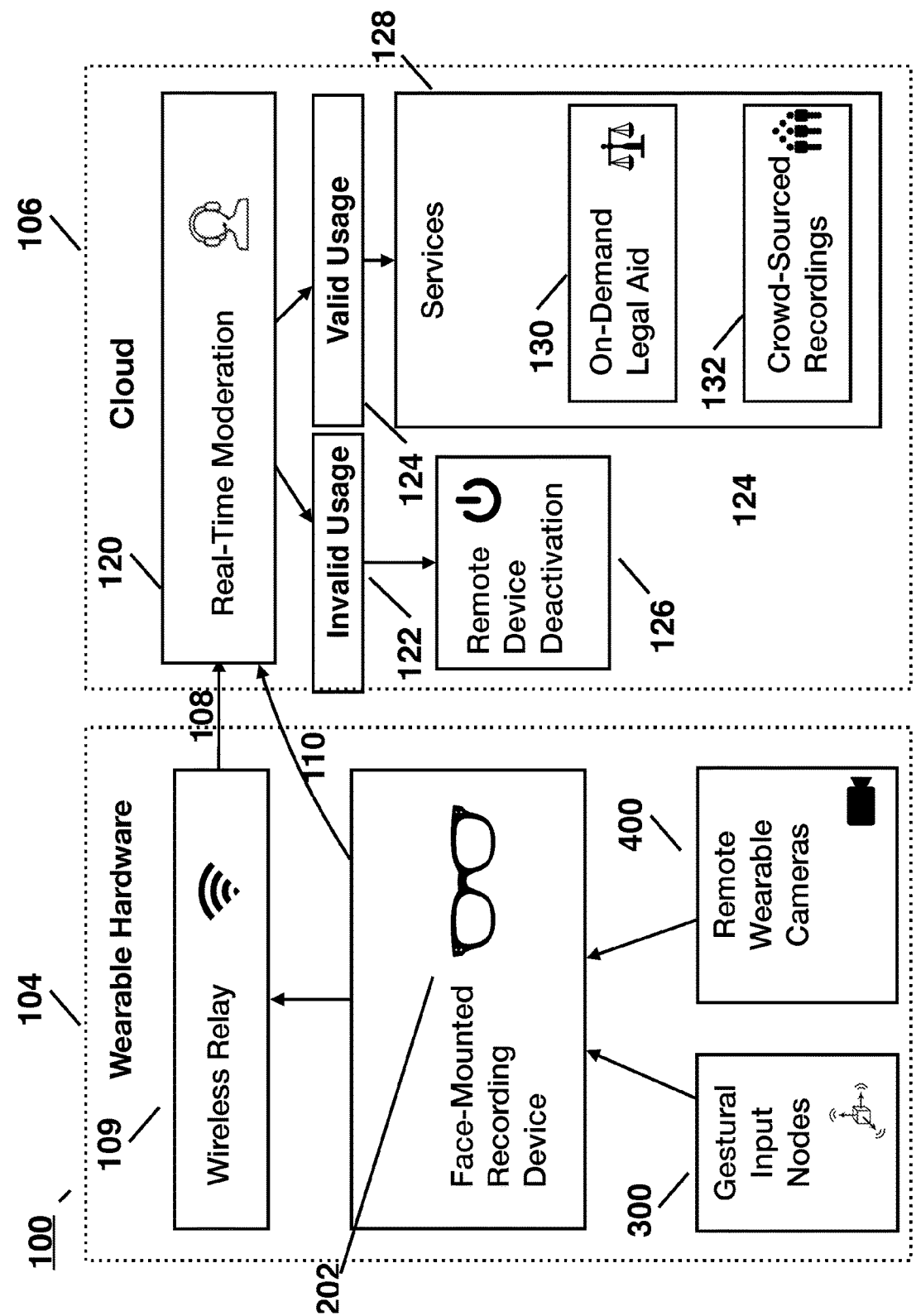
Fig. 1A, System Architecture

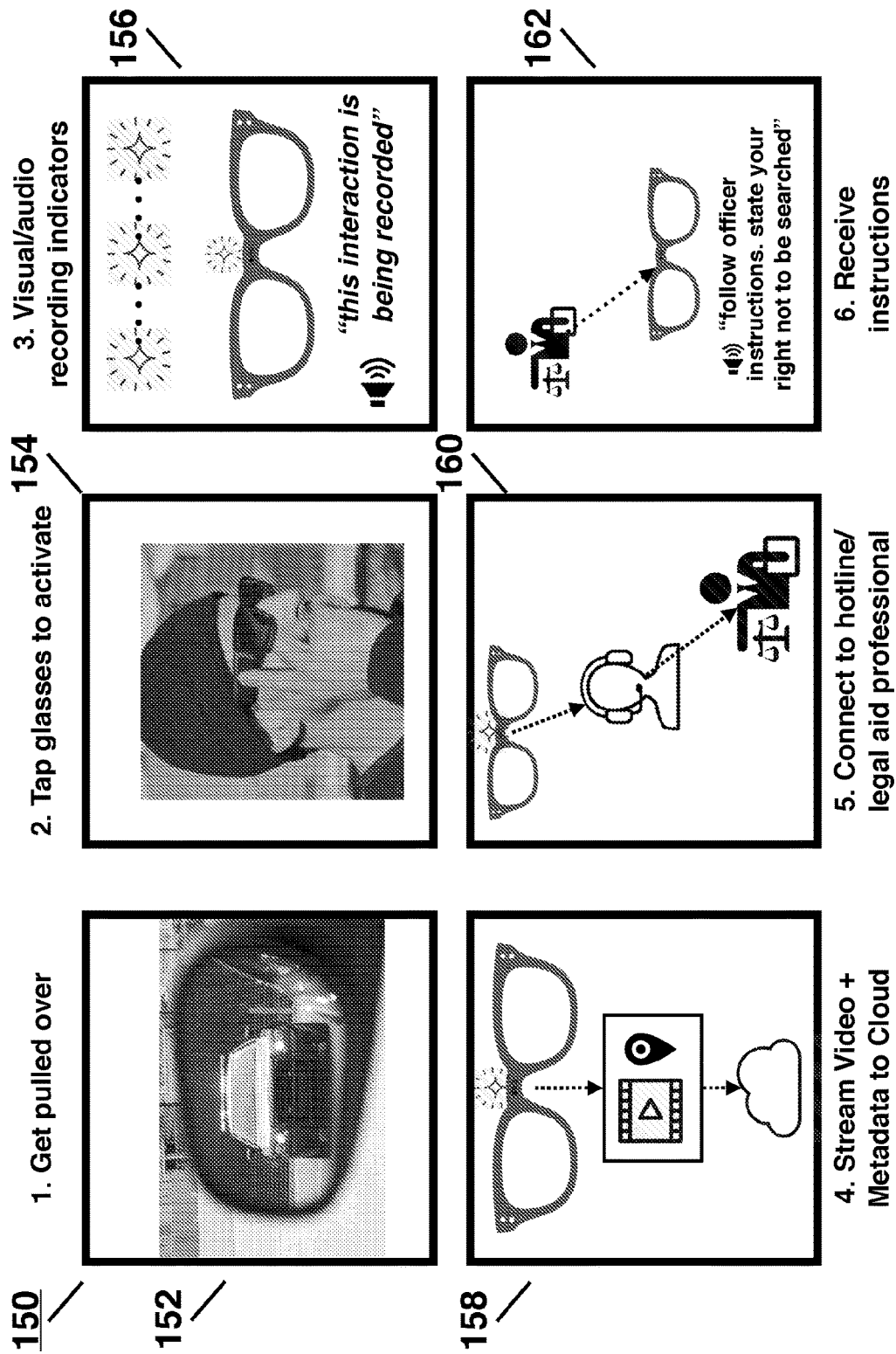

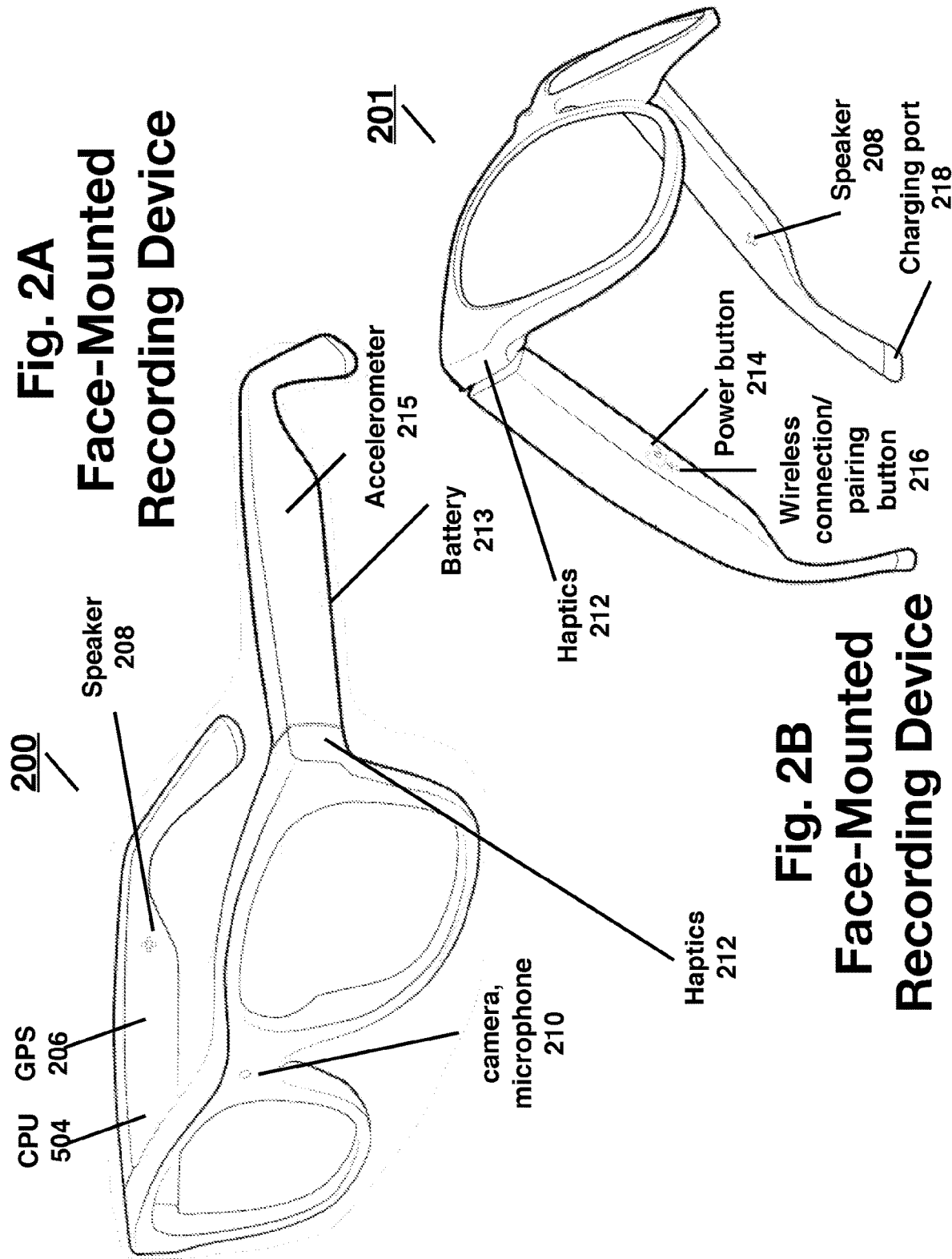

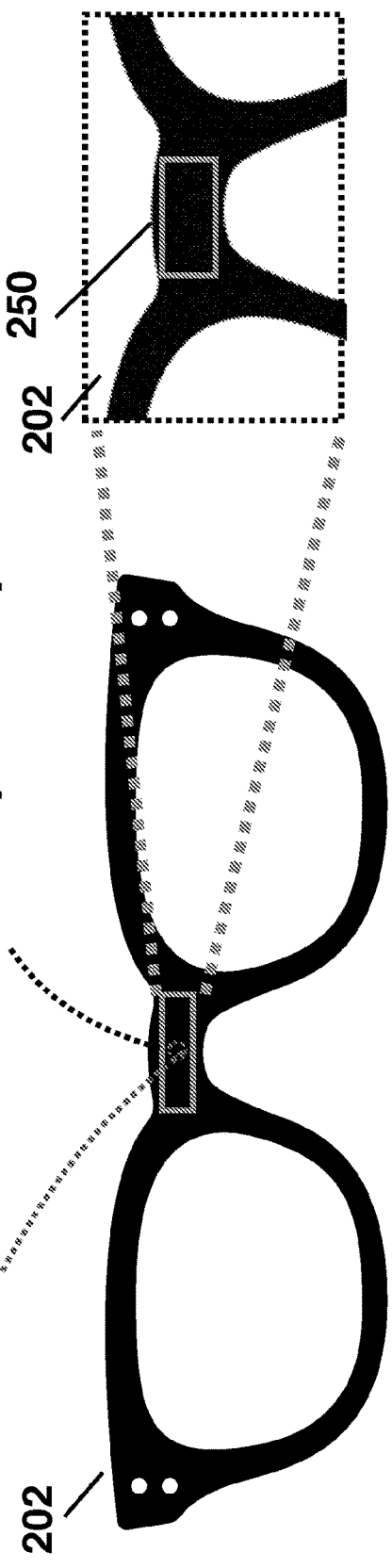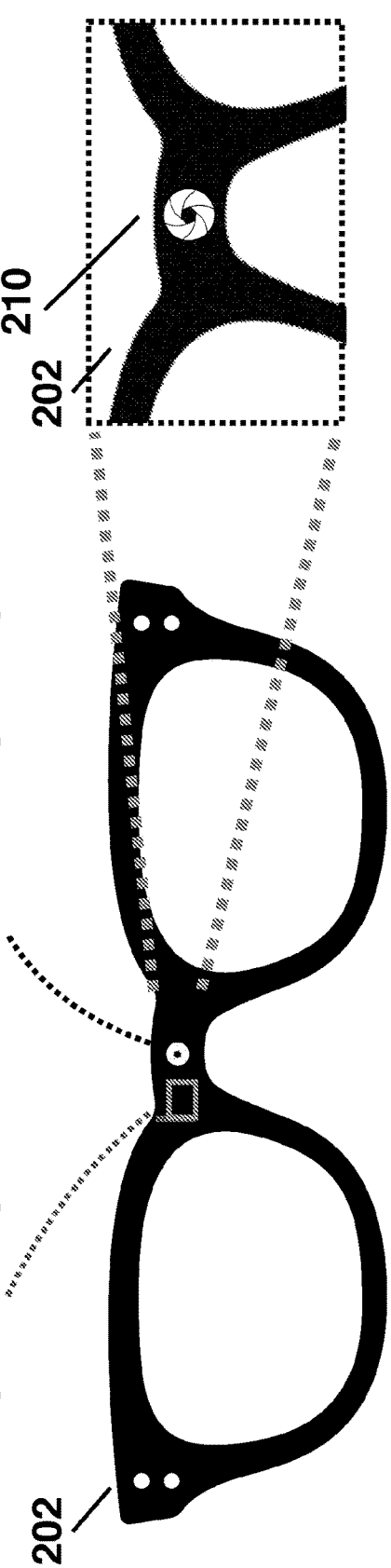
Fig. 2C Fashion Mode
Fig. 2D Transparency Mode

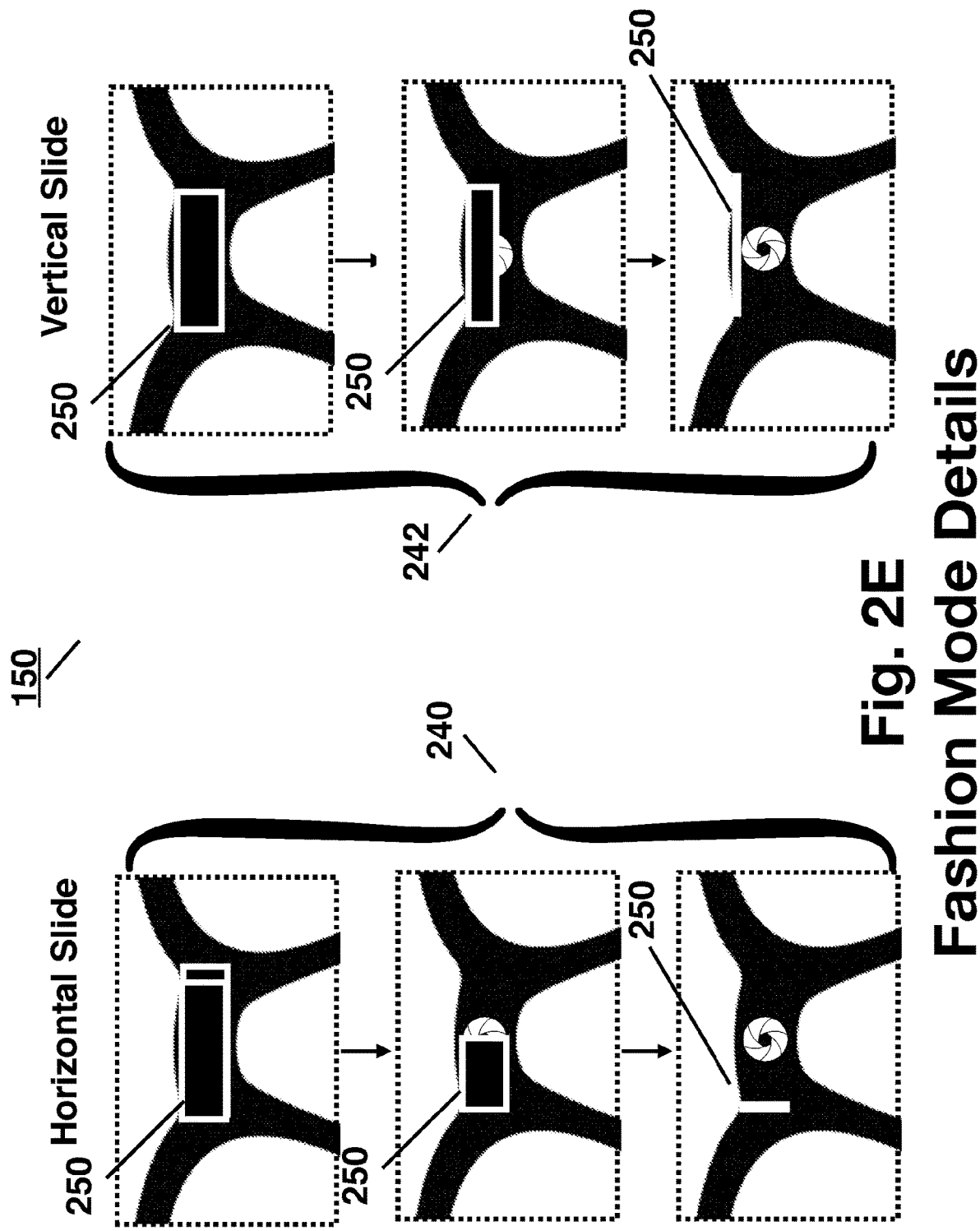
Fig. 2E Fashion Mode Details

Rear-facing cameras

Gestural Input Nodes: Wristwatch/Ring

Gesture-Activated Recording

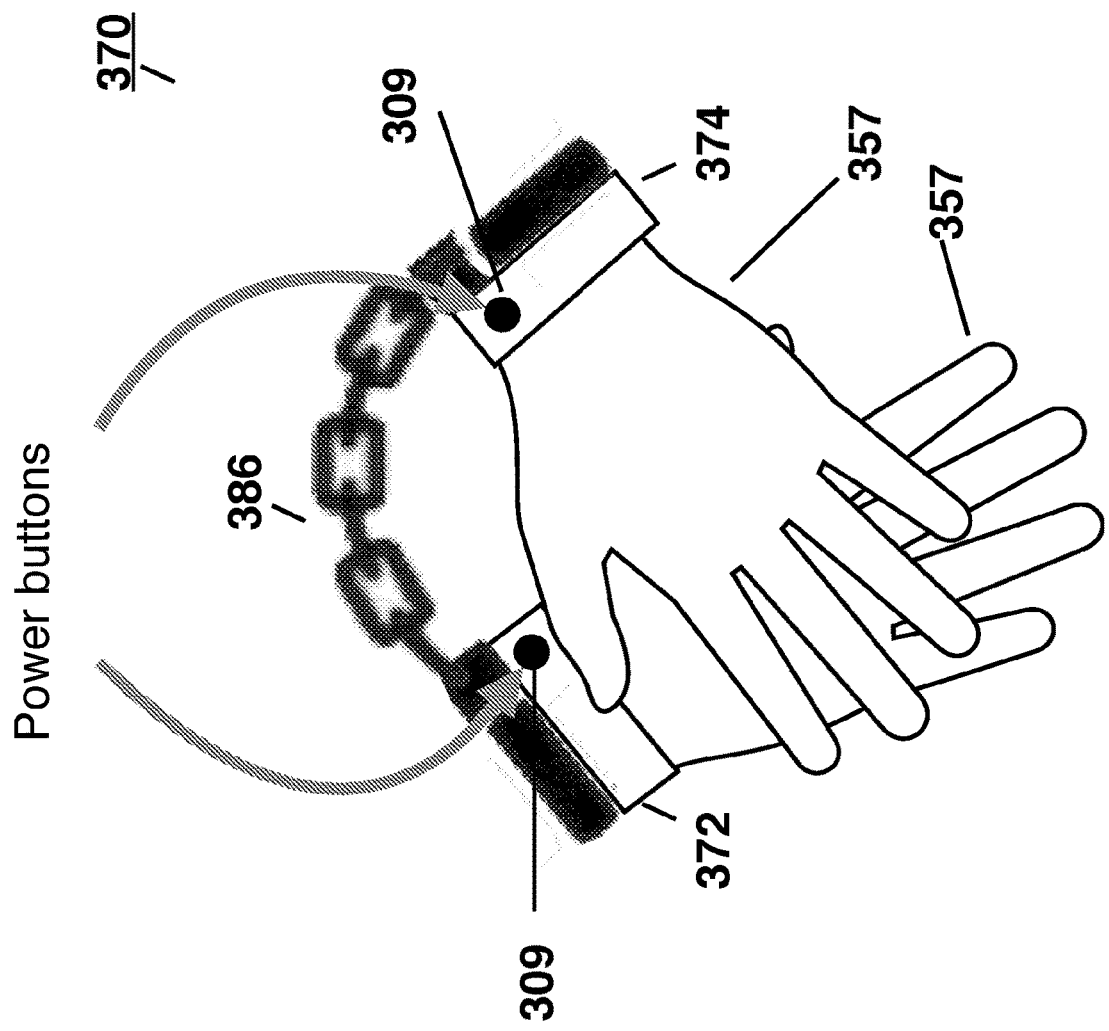
Fig. 3C Activating Recording in Hand Restraints

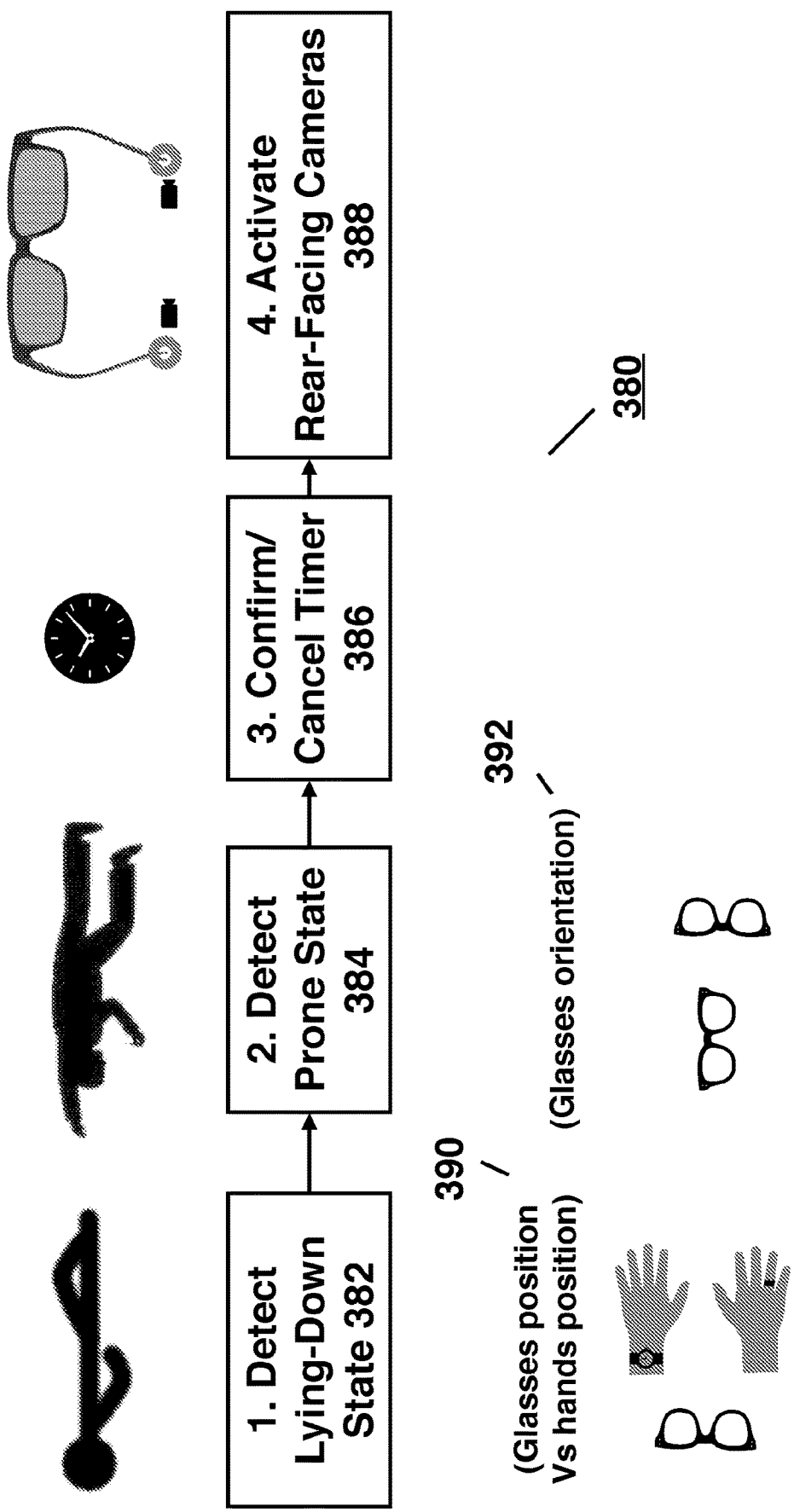
Fig. 3D. Prone-Detection Activating Rear-Facing Cameras

Remote Wearable Cameras

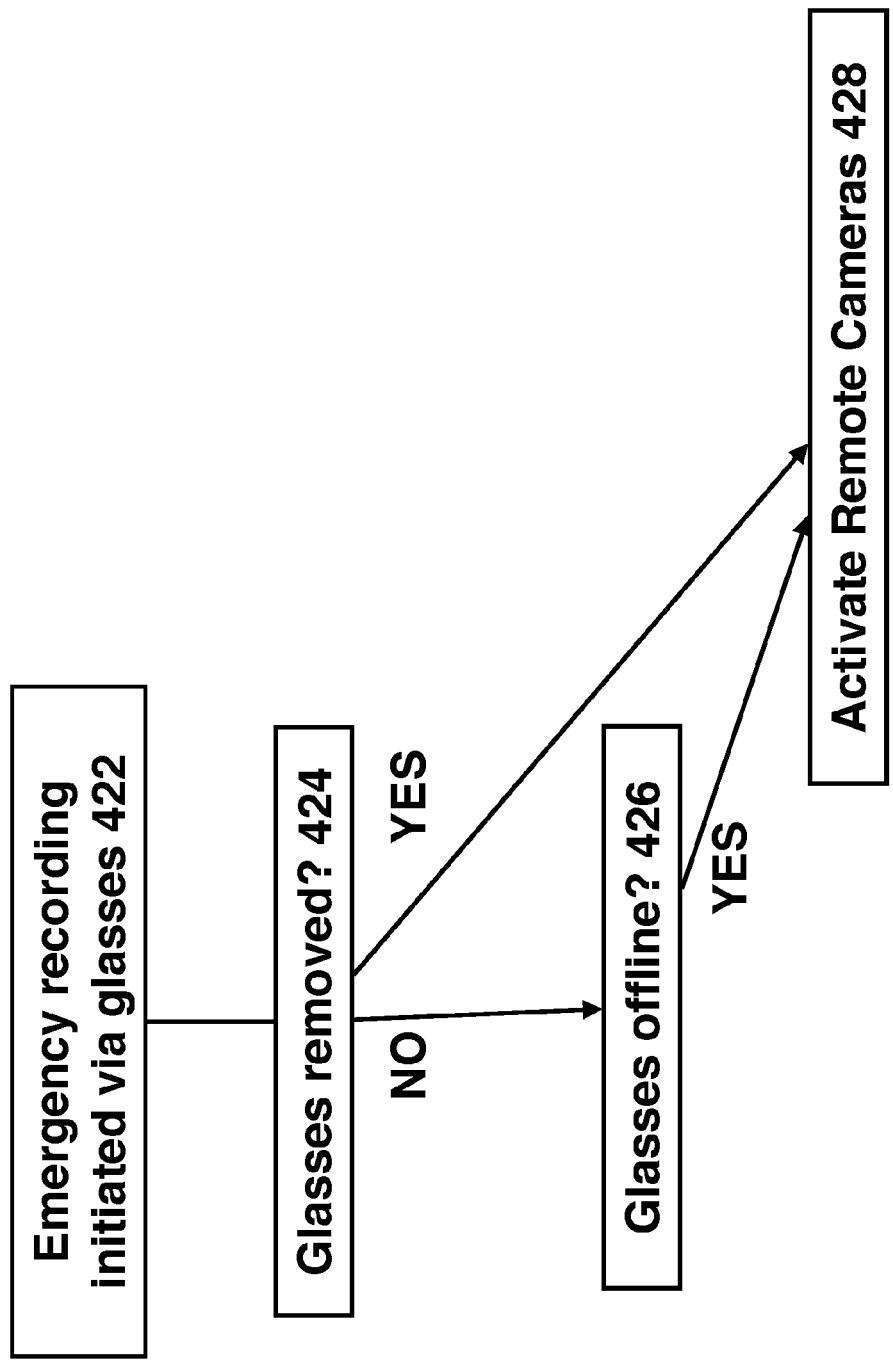

Self Contained vs. Edge Device Architecture

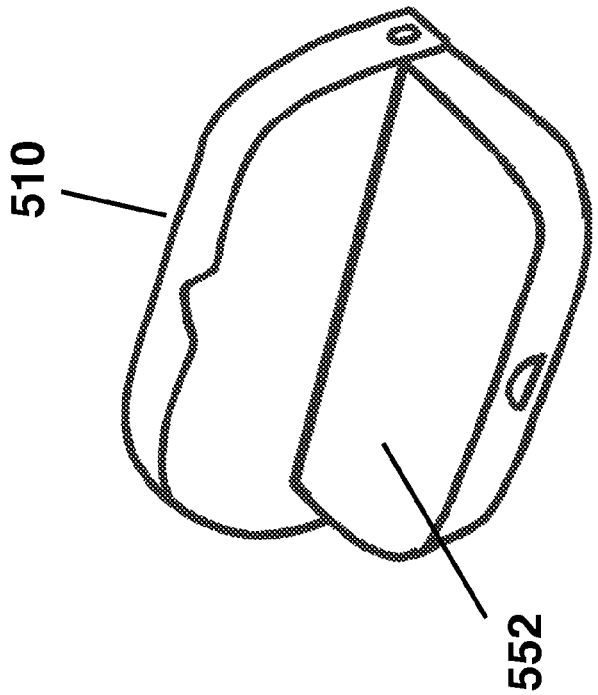
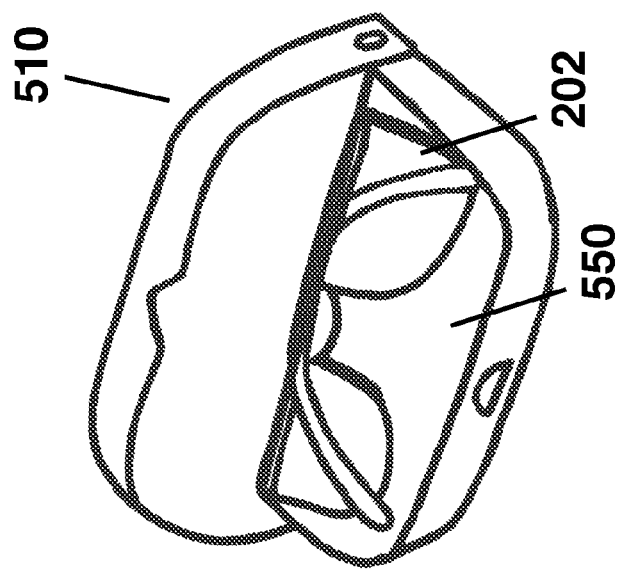
Fig. 5B
Wireless relay charging case

Network Architecture

CAMERA GLASSES FOR LAW ENFORCEMENT ACCOUNTABILITY

PRIORITY CLAIM

This application is a national stage of International Application No. PCT/US2020/070165, filed Jun. 22, 2020, which application claims priority to U.S. Provisional Patent Application No. 62/865,117, filed Jun. 21, 2019, and to U.S. Provisional Patent Application No. 62/865,886, filed Jun. 24, 2019, all of which are hereby incorporated herein by reference in their entirety.

FIELD OF THE INVENTION

The present disclosure generally relates to wearable technology usable in contexts of preserving personal security. The disclosure relates more particularly to apparatus usable as facewear, such as glasses, and as a recording device with an ability to record images, audio, metadata and/or video and transfer that content to a secure location, possibly in real-time. The apparatus may be used alone or in combination with other body-worn devices which activate in specific scenarios.

BACKGROUND

Recent mass protests underscore the continued need for an effective solution to the problem of excessive use of force by law enforcement.

Body cameras worn by police officers have become the main technology used to solve this problem. In theory, these devices ensure that the public can access video evidence of interactions, especially ones resulting in violence. In practice, however, numerous problems prevent these devices from producing evidence leading to accountability for law enforcement. The officer might not be wearing the device or may forget to turn it on; the device may "malfunction" at the critical moment; footage may be deleted or altered by police departments. Furthermore, civilians may be legally prevented from accessing relevant footage by police department policy.

In response to these challenges, civilian camera phone recording has emerged as a new technology to document police interactions. Without bystander camera phone video footage of George Floyd, for example, officer Derek Chauvin would have likely faced no legal consequences for his actions. However, phone recording presents its own set of challenges, especially when used by the civilian directly interacting with a police officer, as opposed to a bystander.

Camera-phone recordings require holding and operating a metallic object in one's hands, which may be mistaken by an officer as a firearm. They may also require reaching for the phone, for example, removing it from one's pocket or retrieving it from one's vehicle, both of which may be misinterpreted by police as reaching for a weapon. Operating a camera-phone requires using one's hands, which may reduce the civilian's ability to comply with officer instructions. Moreover, despite the constitutional right to record in public spaces, the act of overt filming may itself be perceived as illegal or aggressive by poorly trained or biased law enforcement officers. Attempts to safely and legally record police with camera-phones may thus, ironically, lead to increased violence.

Recording from camera glasses offers a potentially superior solution. Unlike body cameras, civilians can wear glasses in public without violating fashion or social norms. Unlike camera phones, camera glasses can be operated without using one's hands. Recently released camera glasses like Facebook's Ray-Ban Stories prove that current technology can deliver recording capability in a lightweight and fashionable package.

Camera glasses, however, present their own challenges. A fundamental problem is whether the camera is visible to people in the wearer's immediate surroundings. If the camera is visible, it may make others uncomfortable because they don't know if they are currently being recorded. This was the so-called "Glasshole" problem faced by Google Glass, leading to the device being deemed socially unacceptable. On the other hand, if the camera is concealed or invisible, the glasses could be easily abused to spy on others. In other words, a visible camera violates established social norms, while a concealed camera leads to unacceptable privacy violations.

Additionally, some of the same limitations of camera phone recordings still apply. Being obvious in initiating the recording may be an issue, for example in the scenario where a civilian is instructed by a police officer to put their "hands up." In such a case, any action other than immediate compliance could lead to violence.

Additionally, a hostile or biased law enforcement officer may attempt to remove the camera glasses, deactivate, disable, or destroy the device.

Finally, although filming law enforcement in public is legal in all 50 states, the law differs on the specifics across state lines. For example, recording audio without the consent of all parties is not allowed in all states. In other words, a device may ship with a configuration of features that are fully legal in some states, but illegal in others.

SUMMARY

The present disclosure is directed to face-worn monitoring devices that facilitate the safe and legal recording of interactions with law enforcement. In one aspect, the monitoring device comprises a frame usable as facewear, one or more cameras built into the frame, a cover, attached to the frame, that covers the camera(s) when not in use, and a communication circuit for communicating, directly or indirectly, with a remote server, working alone or as part of a set of other linked monitoring devices. In one embodiment, the system enables a button or gestural recognition to activate recording.

BRIEF DESCRIPTION OF THE DRAWINGS

Various embodiments in accordance with the present disclosure will be described with reference to the drawings, in which:

FIG. 1A shows a system architecture of an embodiment of a system containing a monitoring device.

FIG. 1B shows an example of a use case for a monitoring device, including data upload and real-time support processes.

FIG. 2A shows a first view of an embodiment of a monitoring device in accordance with the claimed invention.

FIG. 2B shows a second view of the monitoring device of FIG. 2A.

FIG. 2C shows an example fashion mode of the monitoring device of FIG. 2A.

FIG. 2D shows an example transparency mode of the monitoring device of FIG. 2A.

FIG. 2E shows an example of a horizontal slide and a vertical slide covering a camera in an embodiment of the monitoring device.

FIG. 3C shows an example of activating recording in hand restraints.

FIG. 3D shows an example of prone detection to activate rear-facing cameras.

FIG. 4B is a flow chart showing activation of the remote wearable cameras of FIG. 4A.

FIG. 5B shows a charging mode and a hotspot relay mode for a wireless relay charging case for the monitoring device.

DETAILED DESCRIPTION

Overview

Figure 2F:
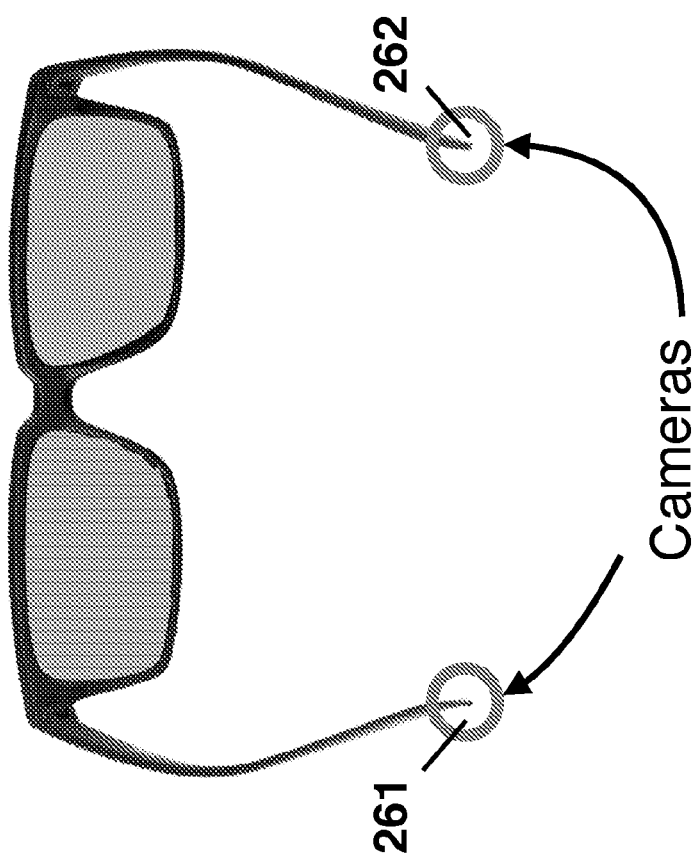
FIG. 2F shows an example of placement of rear facing cameras on a monitoring device.

An intended user of the device described herein is a law-abiding private citizen who may be at greater risk of experiencing police profiling or violence due to their personal characteristics, including race, sexual orientation, gender identity, neurodivergent mental state (e.g. autism, PTSD), profession (e.g. journalist, activist), and/or other factors (such as presence at a peaceful protest).

As the issue of systemic bias in police violence has gained widespread attention in recent years, the wearable police bodycam has emerged as a potential technological solution. Since 2014, when President Obama asked Congress for $263M in funding for police body cameras and training, the majority of US police departments and officers have been equipped with bodycams. Despite this widespread adoption, several large-scale studies indicate that the devices have had no significant effect on police behavior. Recent global protests have underscored the continued need for an effective solution to the problem of state-sponsored violence.

The police bodycam is failing to achieve its intended purpose for several reasons spanning both technology and policy levels. At the device level, problems include the device not being turned on during a critical incident, the device malfunctioning, and the device not capturing relevant footage due to the camera not facing the right direction. These problems are compounded by a lack of policies mandating, for example, that devices be turned on at critical times, such as when a weapon is drawn. Even when the device captures relevant footage, evidence may remain inaccessible to private citizens due to a lack of policies mandating public access to the footage.

As a result of these problems, the citizens who were supposed to be protected by police bodycams are often not protected at all by this taxpayer-funded technology. In the gap left by the failure of bodycams, many citizens have turned to smartphones as a device to document interactions with law enforcement. The smartphone is well suited to the task in several respects: most people carry it with them at all times, it can record video and audio, and it has an internet connection for uploading or transmitting the video. However, the smartphone suffers from a number of major flaws for the use case of recording video during an arrest: 1) it requires the use of one's hands to operate; 2) the user may need to devote their attention to operating the device, rather than following instructions from law enforcement, and most importantly; 3) in a tense situation, reaching for one's smartphone (for example, in one's pocket or in the dash of one's vehicle) may be misinterpreted by armed police as an act of aggression (i.e. reaching for a gun), with potentially fatal consequences.

These challenges present an opportunity for a new device allowing members of the public to effectively and safely record their interactions with police. The invention described below incorporates several innovations to help ensure both that 1) vulnerable law-abiding private citizens can remain safe during interactions with law enforcement, and that 2) the system itself is not vulnerable to abuse, i.e. spying on fellow citizens.

Broadly speaking, the system includes a number of wearable hardware devices interacting with a cloud-based system. The wearable devices include networked camera glasses with the ability to capture and transmit video and audio; gestural input nodes allowing the user to activate recording via buttons or hand gestures; one or more remote wearable cameras allowing the user to continue recording even if the glasses are removed or disabled; and an optional wireless relay allowing the glasses to be smaller/slimmer due to processor-heavy tasks like wireless connectivity, compression and/or encryption being handled by the remote device. The cloud supports several features including real-time content moderation; the ability to detect abuse and deactivate devices in real-time; the ability to connect a user in real-time to on-demand legal aid; and the ability to generate crowd-sourced recordings by nearby private citizens such as protesters, activists, or allies.

A unique aspect of the device is the ability to transition between a passive "fashion mode" and an active recording or "transparency mode". This allows the user to protect themselves by wearing the device throughout the day, without violating social norms or the privacy of those around them. Another unique aspect of the invention is the ability for the device to automatically update its configuration to comply with local legal statutes based on the user's real-time location.

Other unique aspects of the wearable hardware system are several innovations designed to ensure that the device(s) can continue safely recording even in a hostile or potentially dangerous environment, such as an arrest. These include gestural input nodes allowing for activation of recording in situations when pressing a button on the glasses might be dangerous or impossible: via a "hands-up" gesture if instructed to raise one hand's by law enforcement; or, buttons or gestural recognition to activate recording if the user's hands are physically restrained e.g. by hand-cuffs.

The key innovative aspects of the cloud include the ability to route a validated distress signal in real-time to a network of on-demand legal aid providers and/or a citizen network. The on-demand legal aid service 130 functions essentially like calling local police emergency services (e.g. "911" in the United States, "112" in France, etc); the key advantage being that calling the authorities may be unhelpful if the authorities are the source of the current threat, e.g. in a case involving racial profiling of a law-abiding citizen. The key advantage of the citizen network is the ability to generate crowd-sourced recordings which could provide a backup source of admissible evidence if the user's device and/or recording is completely disabled/deleted.

The last major innovative aspect is real-time moderation, allowing for detection of invalid usage and remote device deactivation, for example, in the case when the device is improperly used to record other private citizens.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Furthermore, aspects and embodiments of the invention described herein are merely exemplary, and should not be construed as limiting the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

As used herein, a response node is anything that can capture or collect information from its surrounding. In accordance with some embodiments of the invention, a response node may be a camera, a microphone, a motion sensor and any combination thereof.

As used herein a control module executes software that analyzes information received from a device. The information may be environmental, state (active or standby) of the device, configuration (enabled/disabled features) of the device, and identification information about the device. As used herein environmental information includes without limitation: video recording, audio recording, captured images, metadata, and location information.

The device can be used as facewear, as in a pair of glasses, and can be usable in a monitoring mode or a passive mode. In the passive mode, or fashion mode, it is not apparent from viewing the device that it has a monitoring mode. In the monitoring mode, a visual and/or an audio indicator indicates that monitoring is occurring.

The apparatus may also be used in conjunction with a set of linked wearable monitoring devices, which may perform the security-related functions if the main device is disabled or removed.

When monitoring, the captured media can be sent to a server where it is processed and forwarded to a human advisor, and/or processed by the server. The server can provide advice and feedback to the wearer of the device.

The following provides an overview of the various functions of the device and various embodiments. Examples of use cases are to record data, save data, deliver real-time alerts, and/or receive/display real-time instructions from one or more professional support hotlines.data When recording, the device might record environmental information including video, audio, and relevant metadata. Metadata might include a timestamp, a location, and/or identification of any law enforcement officers or others involved in an interaction being recorded. Locations might be discerned from a GPS module, a cell tower signal, landmarks or street signs visible from video, and/or audio cues as to location, e.g., "corner of 17th and Utah." Identification of a law enforcement officer might be by visual ID of names/badges from video, or audio cues, e.g., "Officer William Jones."

The environmental information might be saved locally to the device or a local storage device, and can then be downloaded off of the device via USB or wirelessly, or uploaded wirelessly to the cloud. The environmental information might be compressed and/or encrypted before saving and/or cloud uploading.

Real-time alerts might be delivered via text message, phone call, and/or video stream, to recipients such as a trusted contact, e.g., friends or family, or a professional support hotline, e.g., legal aid societies, or to other third-parties, e.g. a network of vetted private citizens, "Good Samaritans", or allies who volunteered to provide support in cases of distress.

Real-time instructions from a professional support hotline might be received/displayed such as with audio or visual cues. The display instructions might include audio cues delivered by built-in speaker, audio cues by bone conduction speaker audible only to wearer, and/or visual cues, potentially displayed via optical display built into facewear.

A system might be implemented using cloud-based servers, storage, video processing, etc. Example embodiments include a fully self-contained device where connectivity is built into the facewear and embodiments where the facewear is an edge device that connects to a nearby relay device.

In the fully self-contained device embodiment, the facewear might comprise but is not limited to a frame, lenses (prescription, reading, or plain), as well as a camera, a microphone, a microprocessor, a wireless connectivity chip, encryption software/hardware, a battery, haptics, an indicator light, a speaker for audio warnings, etc. A base station for this embodiment might include a charger, perhaps shaped as a glasses case.

In the edge device embodiment, the facewear might record video, compress video, and send over short-range wireless connection, such as Bluetooth™ channel, to a base station device, perhaps configured as a glasses case, and then the base station encrypts the video, handles any other video processing tasks, and streams video to cloud via higher bandwidth wireless connection (e.g., 802.11 or cellular).

In the passive or fashion mode, the facewear is not monitoring and might have no observable difference to the naked eye versus regular glasses/sunglasses or other facewear, with no camera visible, no indicator lights, and no external buttons, charging ports, etc., visible without some disassembly. When switching modes, there might be a physical button that is to be held down for some period (one second, five seconds, etc.) or pressed rapidly a number of times (three times, five times, etc.) in quick succession to activate the device. Switching modes might also be triggered via gestural input nodes (e.g. detecting specific hand positions); in some instances, switching modes may be triggered automatically by the cloud, without any user input, in accordance with the real-time compliance and configuration update process described in FIG. 8.

The device might emit a confirmation signal, such as an audio cue with prompting (such as "Tap 2× to confirm if you are being pulled over or hold for three seconds to reset to passive mode."). Haptic cues might be provided. Once confirmed, the device might begin its activities. Other modes of activation might include voice activation, sensing for certain words to be spoken, or activation by a gesture.

Once activated, a cover flap or sliding flap might open to expose a camera and an indicator light and the device begins recording, flashing an indicator light, and starting video streaming video. The device might be deactivated back to the passive mode using a button, a voice input, and/or a gesture. The action to deactivate might be specific to the wearer of the device so that others are not able to easily deactivate. For example, the wearer might be required to tap a code or make a certain recognizable gesture.

FIG. 1A shows a system architecture 100 of an embodiment of a system containing a monitoring device (also called a face-mounted recording device) 202, including video upload ability and real-time support processes. FIG. 1A shows wearable hardware 104 and cloud-based system 106. A wearer (also called a user) wears a monitoring device 202, such as glasses on the wearer's head. A wireless relay 109, for example a wifi hotspot, allows communication 108 between a monitoring device 202 and cloud system 106. Wireless relay or cell service 109 can be incorporated into the monitoring device or can be separate from the monitoring device connected by a protocol such as Bluetooth. Alternatively, monitoring device 202 can communicate directly 110 with system 106. For example, device 202 may include a data-enabled cellular sim chip that allows direct data connection 110 to the system 106. Monitoring device 202 (also called a face-mounted recording device) receives input from gestural input node(s) 300 as described in more detail below. Monitoring device 202 communicates with one or more remote wearable cameras on the user's person so that the remote wearable cameras can determine whether device 202 is operational. Device 202 communicates the recorded environmental information over a network to a cloud based storage system directly 110 or via a wireless relay 108. This communication can be in real time or the content can be stored locally and communicated at a later time.

In one embodiment, device 202 communicates with a hotline or legal aid professional in the cloud as discussed in more detail below. For example, the hotline may receive the recorded environmental information, data identifying the location of the user, data indicating the identity of the user, and data indicating the type of situation the user is in, e.g., a video stream.

Referring again to FIG. 1A, the wearable hardware system 104 is in communication 108 with a system 106 in accordance with the various aspects of the invention. The system 106 includes a graphical user interface (GUI) 120 and an invalid use control module 122, and a valid use control module 124. A moderator uses the GUI 120 to monitor the content including environmental information being captured by the system 104, as outlined with respect to FIG. 7 below. The moderator uses an input device (not shown) to interact with system 106 and the control modules 122 and 124. The input device may be any means through which the moderator can provide input to the system 106 and the control modules 122 and 124, such as a keyboard, touch screen, camera, microphone. Upon determining the content of the information captured by the device 104 as being an invalid use, the moderator uses the control module 122 to generate a signal 126 to remotely deactivate the device 104. If the content of the information captured by the system 104 is a valid use, then moderator uses the control module 124 to activate the services control module 128. As shown for exemplary purpose and in accordance with some aspects of the invention, the module 128 includes: a legal-aid control module 130 that alerts nearby legal services, as outlined in general with respect to FIG. 9; and crowd-sourced recording control module 132, as outlined in FIG. 10.

FIG. 1B shows an example of a use case 150 for monitoring device 202. In the use case shown, a driver is pulled over 152 by a law enforcement officer while wearing monitoring device 202 in fashion mode. In this example, when device 202 is in fashion mode, it looks like a pair of ordinary glasses. The user activates 154 device 202 before interacting with the law enforcement officer. Such activation may be, for example by tapping an activation button on device 202 or by voice activation if the embodiment of device 202 recognizes voice commands. In some embodiments, including the one shown, the user may receive instructions 162 via the cloud instructing them how to interact with law enforcement.

When device 202 is activated in this example, it enters transparency mode to indicate to observers that they are being recorded. Once activated, monitoring device 202 begins recording environmental information and gives visual and/or audio warnings 156. For example, device 202 may show a camera lens and a flashing light to indicate that it is recording. In the embodiment shown, device 202 also begins an audio warning such as "This interaction is being recorded." This audio warning may be repeated periodically as required by local law. This might be a requirement in certain jurisdictions, such as for compliance with jurisdictional statutes regarding covert recording or two-party consent to recording. Also, if law enforcement officers know they are being recorded, they might be less likely to take certain inappropriate actions. Also, with the obvious visual indicator, device 202 might be less likely to be used for socially unacceptable monitoring.

As discussed below, device 202 begins collecting 158 environmental information, including for example, video, audio, stills, and metadata, which is uploaded 160 directly or indirectly to a hotline and may be further transmitted to a legal aid professional.

FIG. 2A shows a first view 200 of an embodiment of monitoring device 202 in accordance with the claimed invention. The device may have either prescription or non-prescription lenses and/or sunglasses lenses. Monitoring device 202 can be in the form of glasses or other wearable device. Monitoring device 202 comprises but is not limited to a CPU 504, a GPS system 206 for determining a GPS location of the device, a right side speaker 208, a camera (optionally with microphone) 210, haptics 212 on the left side of the device, a battery 213, and an accelerometer 215. Other embodiments also include a cover 250 (see, for example, FIGS. 2C and 2D). Other embodiments also include a gyro built-in to monitor 202 in addition to or instead of an accelerometer so that a processor can communicate with the gyro to determine changes in orientation of monitoring device 202.

Device 202 can contain a processor that performs multiple functions. Device 202 further includes an activation determiner, such as a processor that receives signals from one or more of: an activation button in device 202, an activation button 309 in a gestural input node (such as a watch, ring, or wristband) or a gesture identifier element in device 202. The activation determiner recognizes at least one of the following as an activation indication 1) an activation button press (from the frame or from a gestural input node) and 2) a gesture based on a signal from a gestural input node as a gesture to activate the camera. Once the activation determiner determines that camera 210 should be activated, it deploys cover 250 (if present) and activates camera 210 so that camera 210 begins to capture environmental information.

FIG. 2B shows a second view 201 of monitoring device 202 of FIG. 2A. In addition to the features shown in FIG. 2A, monitoring device 202 comprises but is not limited to haptics 212 on the right side of device 202. Haptics provide sensory feedback to a user, for example, when the user interacts with the device. Monitoring device 202 further comprises but is not limited to a power button 214, a wireless/connection or pairing button 216, a charging port 218, and a left side speaker 208. Note that some embodiments have haptics 212 or speaker 208 on only one side of the device.

FIG. 2C shows an example fashion mode of the monitoring device of FIG. 2A and FIG. 2D shows an example transparency mode of the monitoring device of FIG. 2A. In some embodiments, device 202 has a fashion mode, which is a passive mode when not monitoring and appears to be normal facewear, and an active mode, where the device is monitoring. In these embodiments, the facewear might not be noticeable as a recording device when it is not in the active mode, but clearly visible as a recording device to law enforcement, passersby and others during an emergency situation or other monitoring situation. For example, in active mode, the camera might be visible or the facewear has a visual indicator of recording, such as a blinking light, or an audio indicator of recording such as an audio voice stating "This interaction is being recorded." This warning may be repeated periodically as required by local law. This might be a requirement in certain jurisdictions, such as for compliance with jurisdictional statutes regarding covert recording or two-party consent to recording.

FIG. 2C shows a cover 250 that covers a camera lens 210. In FIG. 2C, cover 250 is deployed/closed and therefore, camera 210 is concealed by cover 250. FIG. 2D illustrate a visible recording mode where cover 250 is retracted and camera 210 is visible. Once activated, monitoring device 202 might provide an output such as visual instructions or clues and audio or textual instructions or clues, in real-time. In one embodiment, cover 250 is automatically opened by a processor in device 202 when camera 210 is activated. In one embodiment, cover 250 is manually opened by the user, which activates camera 210.

FIG. 2E shows details 150 of an example of a horizontal slide cover 250 and an example of a vertical slide cover 250, respectively covering camera 210 in an embodiment of the monitoring device 202. The left-hand three drawings 240 of FIG. 2E shows a closeup of device 202 with the cover 250 slid horizontally until it covers camera 210 (camera not visible). The second drawing shows cover 250 partly open so that a portion of camera 210 is visible. The third drawing shows cover 250 slid completely open so that camera 210 is completely visible. In one embodiment, cover 250 slides horizontally into a slot in the interior of the device 202. The right hand three drawings 242 of FIG. 2E shows a closeup of device 202 with the cover slid vertically until it covers camera 210 (camera not visible). The second drawing shows cover 250 partly open so that a portion of camera 210 is visible. The third drawing shows cover 250 slid completely open so that camera 210 is completely visible. In one embodiment, cover 250 slides horizontally into a slot in the interior of device 202.

FIG. 2F shows one example of placement of rear-facing cameras 261, 262 on monitoring device 202. In this example, rear-facing cameras 261, 262 are located on the distal end of the arms of the frame. In another example, cameras providing a wide field of view could be located on other surfaces of device 202, such as the top bottom, or sides of the arms. Such cameras are deemed to be rear-facing cameras because they capture video or images that are not in front of the user. One or more rear-facing cameras integrated into the device may be automatically activated by a situation involving police use of force, for example if an impact is detected via accelerometer when the wearer is physically restrained against a vehicle or on the ground and the front-facing camera 210 is not facing towards the potential threat. In these scenarios the rear-facing camera could gather information even when the front-facing camera was pointing away from potential threats.

The rear viewing embodiment might have a button that provides for manual activation, but accelerometers might be installed in the monitoring device to activate monitoring upon detection of a fall, impact, and/or orientation change. This would allow for monitoring to begin if the wearer falls or impacts something, without requiring a manual action by the wearer. In this manner, the wearer could continuously carry a device having a rear-facing camera with automatic emergency activation and use the device as glasses when in a passive mode. This embodiment might be combined with the front-viewing embodiment described above.

Figure 3A:
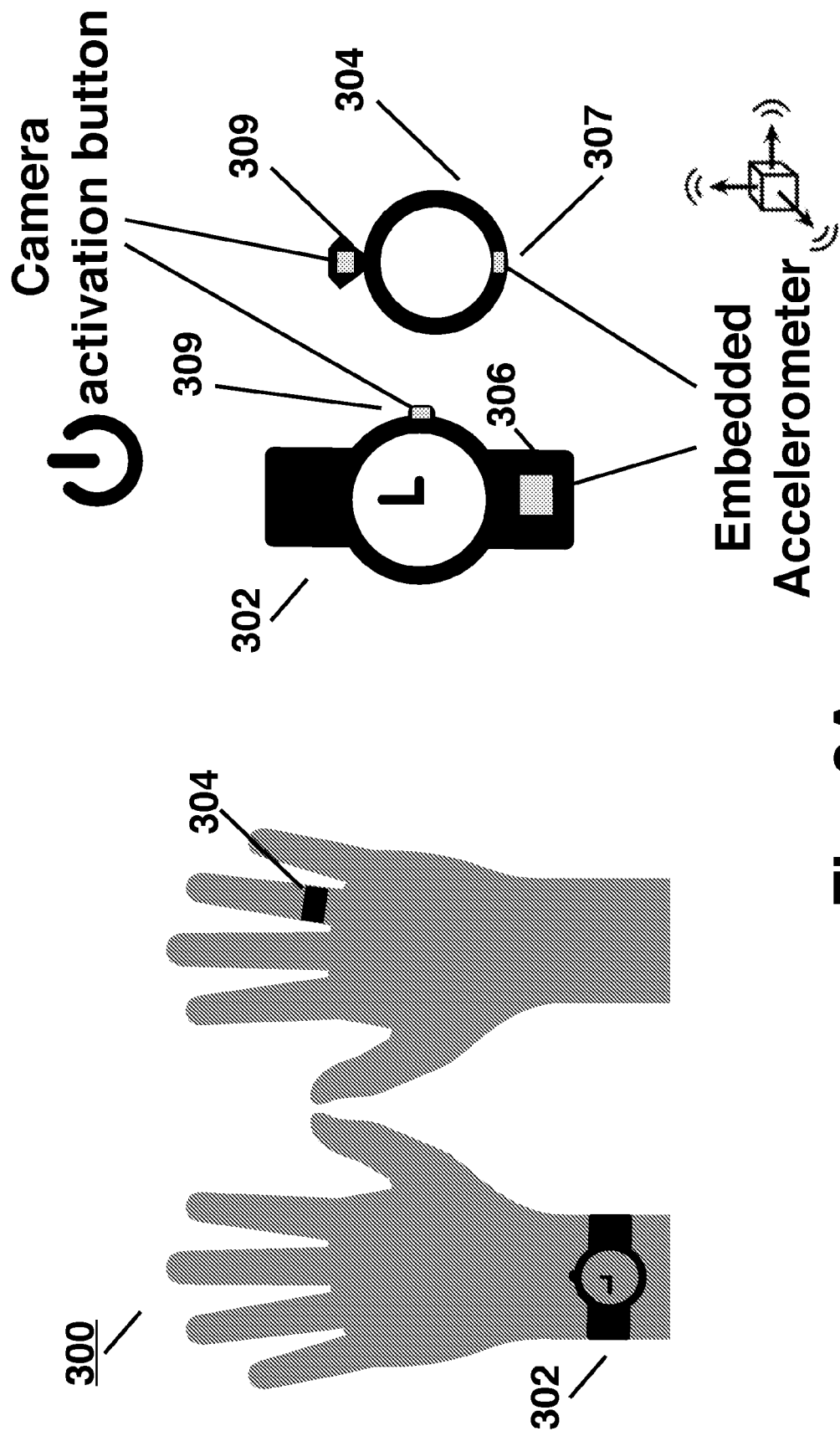
FIG. 3A shows examples of gestural input nodes.

FIG. 3A shows examples of gestural input nodes 300. Gestural input nodes 300 can be, for example, a watch 302 (or simply a wrist band with no watchface) or a ring 304. Both watch 302 and ring 304 have an embedded accelerometer and/or gyro 306 that communicates signals indicating orientation and/or an acceleration of the watch or ring to a processor in the watch or ring. Alternatively, a node may not contain a process but may have a way of communicating movement/orientation signals to device 202 (for example, through Bluetooth). As is known in the art, signals from the accelerometer and/or gyro can be used by the receiving processor to determine movement and/or orientation of the device containing the accelerometer. Thus, it is possible for a processor in the gestural input node to determine that the gestural input node is moving or changing orientation. For example, using signals received from the nodes, it would be possible for device 202 to determine whether a person wearing the gestural input node on their hand or wrist has moved their hands upward or downward. Such identified gestures, based on signals from the nodes, can indicate to device 202 that it should activate camera 210. In some embodiments, gestural input nodes 302 and 304 also contain a camera activation button 309 to enable activation of the camera in the scenario where the user's hands are physically restrained, as described in FIG. 3C. Pushing camera activation button 309 sends a signal to device 202 to activate camera 210.

Figure 3B:
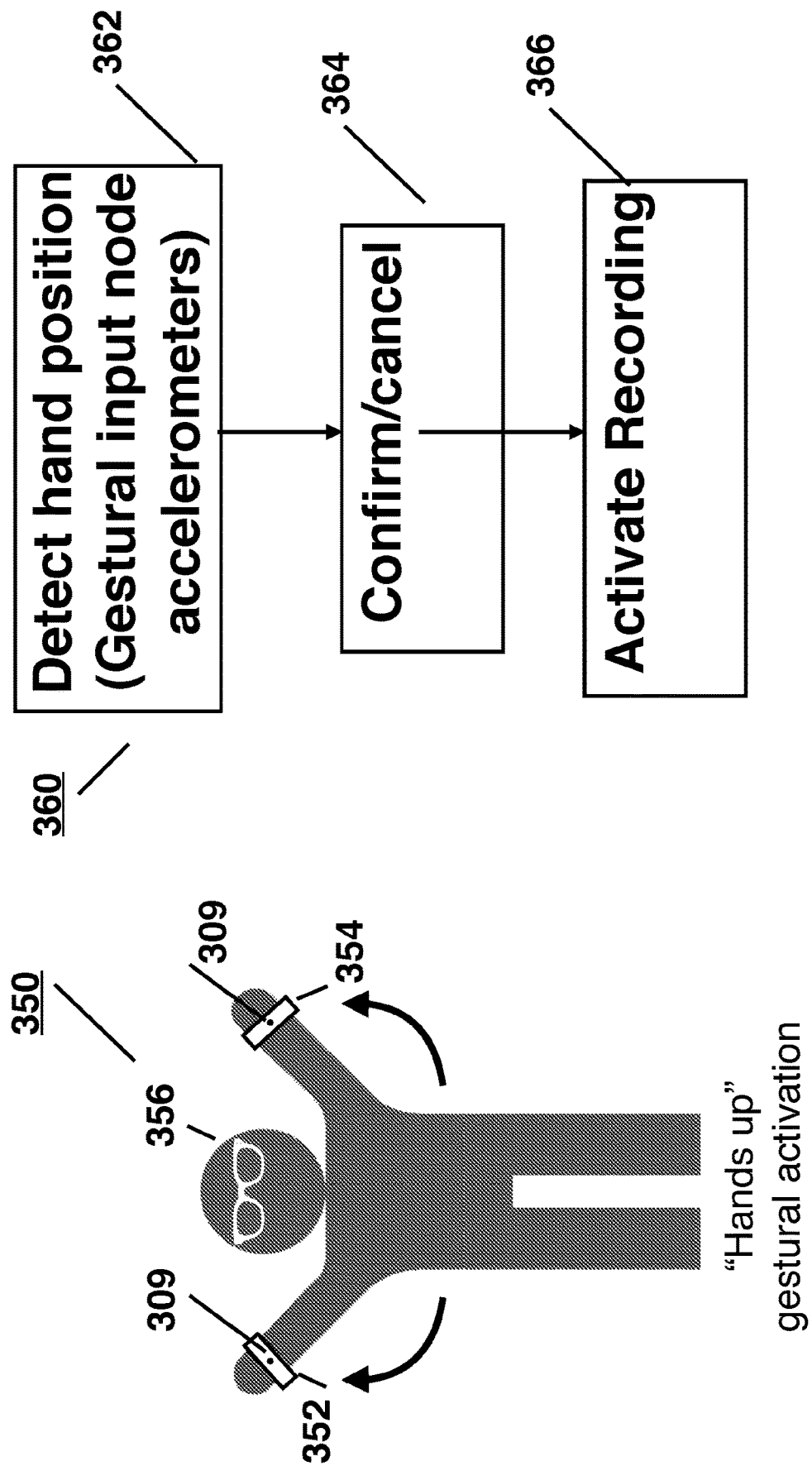
FIG. 3B shows an example of gesture activated recording.

FIG. 3B shows an example 350 of gesture activated recording using gestural input nodes that are simple wristbands, although any appropriate gestural input nodes could be used. For example, a user may be wearing a ring on one hand and a watch on the other hand, both of which are gestural input nodes. One implementation involves a processor "hands up" gestural recognition which would automatically activate the device when the wearer places both hands over their head while complying with police instructions. In the described example, accelerometers/gyros in the gestural input nodes 352 generate motion/orientation signals, which are sent to a processor 504 in monitoring device 202 via, for example, Bluetooth signals. The processor in device 202 analyzes the motion/orientation signals and determines that the signals correspond to user 356 moving their hands upwards and holding them there for a predetermined period of time (for example, at least 5 seconds). In some embodiments, this determination can be made using a series of rules stored in memory that indicate that certain motion signals or a range of motion signals correspond to certain gestures. If the motion signals correspond to a gesture for a predetermined period of time, the processor determines that the user has made the gesture (for example, hands up).

In other embodiments, the processor that identifies a gesture is located in the gestural node and the gestural node sends a signal to device 202 identifying the gesture (instead of signals indicating motion). In yet another embodiment, a processor that identifies a gesture is located remotely, such as in a server accessible over a network or in the device case for device 202, which is connected to gestural nodes and/or device 202 via Bluetooth.

In some embodiments, device 202 202 may include a personalization or setup module allowing the user to specify different hand positions that may activate the "hands up" gesture recognition. For example, the user may be guided to place their hands palms facing forward with their hands at the level of the user's chest, head, or fully outstretched above the head. This setup module may allow the device to recognize the "heads up" or other gestures more accurately and more quickly during an emergency.

FIG. 3B further shows a flowchart 360 showing a method performed by a processor communicating with at least one gestural input node to identify a gesture and activate a camera as a result. First, the processor detects 362 a hand position using signals from, for example, an accelerometer or an accelerometer paired with a gyro in the gestural input node(s). In the example shown, a hands-up gesture requires that both hands be raised and that relevant motion signals are received from a gestural node on each of the user's hands. The user's hand should both be up concurrently, which means that they must both be up at the same time for a predetermined period of time.

In one embodiment, the processor confirms 364 that the gesture was likely intentional by registering a verbal audio confirmation recorded by the microphone 210 (such as "confirm recording") or by confirming that the gesture lasts a predetermined period of time (such as 5 seconds). If the gesture did not last the predetermined period of time, or if a verbal audio cancellation signal is received (such as "cancel recording"), identification of the gesture is canceled. If the gesture is identified, the professor activates 366 camera 210 to begin recording environmental information. In one embodiment, the definition of the Hands-up gesture is a user-settable feature and the user may set whether Hands-up is represented by one or both hands being raised concurrently for the predetermined period of time. Similarly, the user might also be able to set how high the hand(s) need to be raised or for how long. Such settable features are an example of disability accommodation features in device 202. In one embodiment, the predetermined period of time is also a user-settable feature. This setting may allow the user to avoid repeatedly triggering activation if they are about to engage in an activity where one or more hands may be raised repeatedly, for example, attending a street protest.

One advantage of gesture activation 366 is that a user can activate camera 210 in a variety of situations. For example, it may be too loud for a voice command to be heard, or the user does not feel they can safely move their hands to reach an activation button 309. As another example, if the user is obeying a command to raise their arms, they may not have an opportunity to move their hands towards an activation button 309. Not all embodiments of gestural input nodes, such as hands-up wristbands 352,354 have a button 309. Some simpler embodiments only recognize gestural input.

FIG. 3C shows an example of activating recording in hand restraints 380. In the figure, a user is wearing wristbands 372, 374 on one or more of their hands 357. Each wristband 372, 374 has an activation button 309. If the activation button 309 is pressed, a signal is sent to a processor in device 202 (for example via Bluetooth) and the processor activates camera 210. (It should be understood that activation may also include opening cover 250 if such a cover is covering the camera in device 202.) Thus, the monitoring device can be activated even in situations where normal ability to activate recording capabilities via a button on device 202 may be impaired, for example in police use-of-force situations. In some embodiments, wristbands 372, 374 also contain an accelerometer and/or gyro and send motion and/or orientation signals to device 202 so that device 202 can recognize a cross-wrist gesture and activate camera 210 accordingly. FIG. 3D shows an example 380 of prone detection to activate rear-facing cameras. The actions of FIG. 3D are performed, for example, by a processor in device 202 communicating with a gyro in device 202 and receiving signals from one or more gestural input nodes. If the user is detected 382 to be lying down and the user is detected 384 to be lying down facedown (prone), if it is determined 386 the user has maintained that state for a predetermined length of time (for example, 5 second), then the rear-facing camera(s) 262 are activated. This allows the camera to be activated if the user is in a position where they cannot raise their arms or make a similar activating gesture and in which the user's front-facing camera may not provide footage since the user is facedown. The user may also not be able to reach an activation button on device 202 or on a gestural node or wristband. Moreover, it is possible that the user is not conscious. Thus. detection of a lying down prone position should activate the rear-facing camera(s).

FIG. 3D shows an example 390 of device 202 position and hand positions that indicate a lying down position. If the user's hands and device 202 are determined to be substantially in the same horizontal plane, the user is determined to be lying down. In the example, hand position is determined via signals from gestural input nodes on the user's hands. FIG. 3D further shows an example 392 of device 202 position and hand positions that indicate a prone (facedown)

position. If device 202, and thus the user's head, is determined to be oriented toward the ground using signals from a gyro in device 202, the user is determined to be prone. If the processor determines that the user is in both/either of these positions, the processor activates the rear-facing camera(s) 262 since it is likely that the user is lying face down.

Figure 4A:
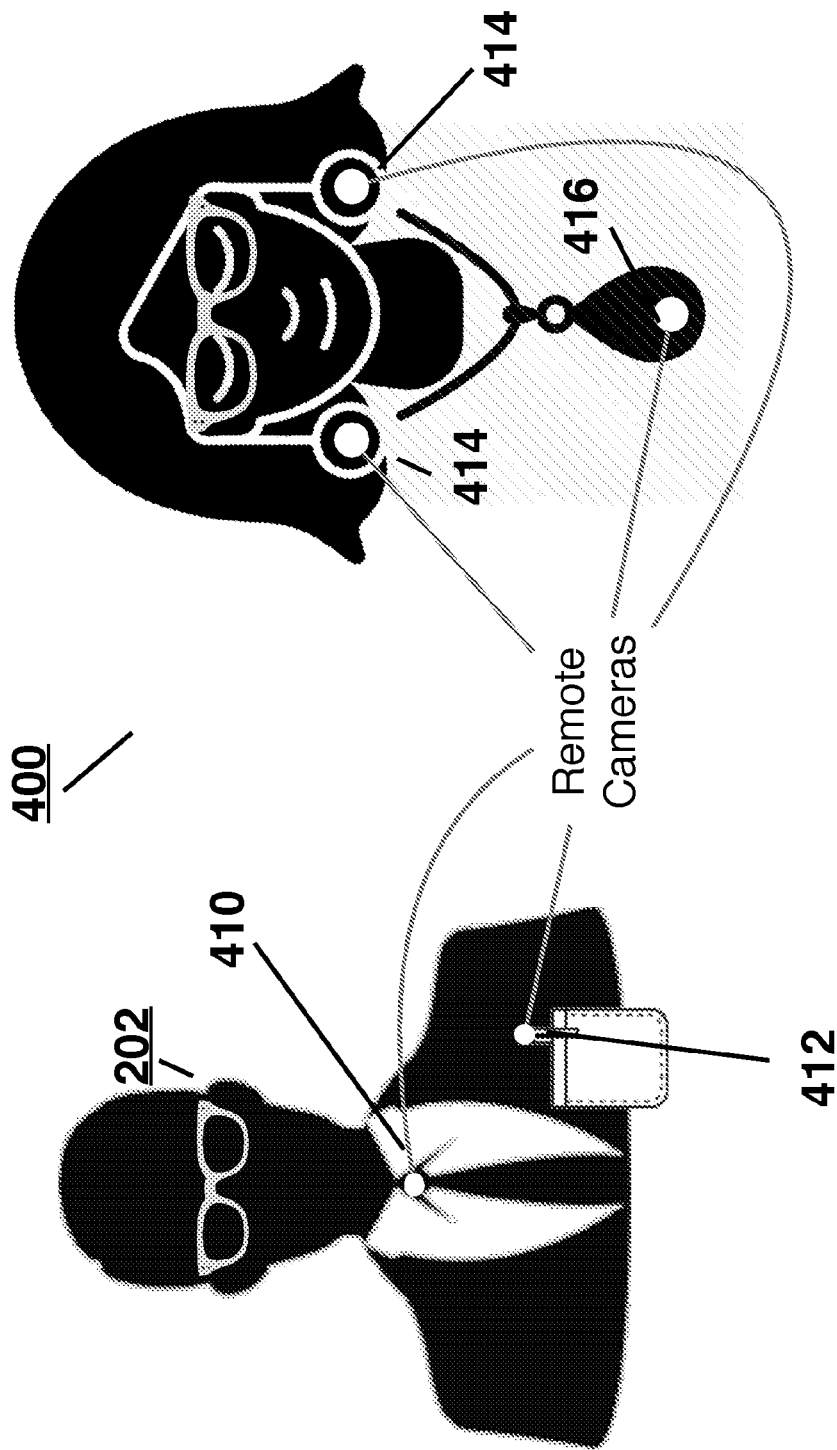
FIG. 4A shows examples of remote wearable cameras usable in conjunction with the monitoring device of FIG. 2A.

FIG. 4A shows examples 400 of remote wearable cameras usable in conjunction with, for example, monitoring device 202 of FIG. 2A. In one embodiment, monitoring device 202 is supplemented with a number of covert remote cameras, which the user could attach to their person or items of clothing. These cameras can be, for example, one or more of a tie clip 410, a pen cap 412, earrings 414, and a pendant 416, although any appropriate ways of wearing a small remote camera could be used. As another example, the user may simply attach additional cameras to their person without worrying about whether they are detectable as cameras.

FIG. 4B is a flow chart showing activation of the remote wearable cameras of FIG. 4A. Normally, an emergency recording is initiated 422 by monitoring device 202 (for example, the glasses). A processor of device 202 acts as a device removal detection element that continually or periodically monitors device 202 to determine whether device 202 has been removed or has fallen from the user's face. This can be determined via the processor in the device 202 accessing signals from the accelerometer in device 202. If the movement or orientation of device 202 indicates that it has been removed 424, device 202 activates the remote cameras since it is likely that the camera 210 in device 202 is no longer pointing toward the area for which environmental information is to be captured. In one embodiment, an activation signal is sent via Bluetooth, causing the remote cameras to wake up 428 and begin capturing environmental information. Thus, the remote cameras would activate in a situation where the camera-glasses were removed without authorization, for example in a police use of force incident where they fall off or are removed from the user's face.

The remote cameras are also activated if they determine that device 202 is offline 426. The remote cameras are capable of communication with the monitoring device 202, by, for example, Bluetooth. In one embodiment, device 202 periodically pings the remote cameras, which normally operate in sleep mode. The remote cameras contain a device disabled detection element that determines that the periodic pings have stopped. When the device disabled detection element determines that the pings have stopped and the mdevice 202 is disabled, it activates the remote cameras from sleep mode 428 and the remote cameras begin capturing environmental information (for example, stills, audio, metadata, and/or video). In a protest situation, it is possible that no wifi or cellular connection is available to upload data. In one embodiment, the environmental information is stored locally until it can be downloaded from the cameras. In one embodiment, the cameras stream the environmental information to a local storage device or to a networked storage device. in another embodiment, the environmental information is stored locally on a microSD storage device.

Figure 5A:
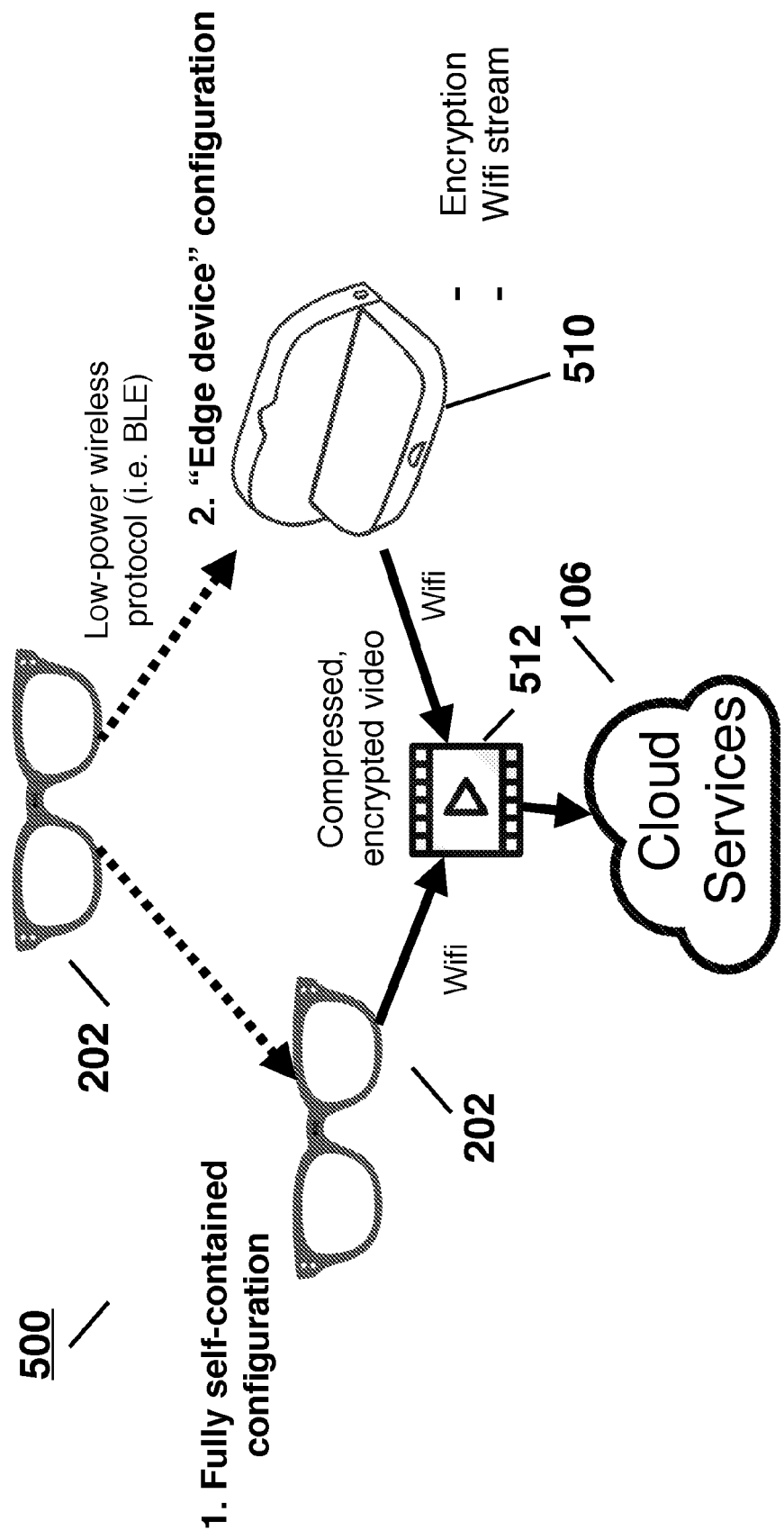
FIG. 5A is a diagram showing multiple ways for the monitoring device to upload environmental information to the cloud.

FIG. 5A is a diagram showing multiple ways for the monitoring device to upload environmental information to the cloud. Some embodiments use one of the below-described methods. In some embodiments, it is also possible that the environmental information is stored locally, either in device 202 or in accessible local storage such as in a memory of case 510 if no way of reaching the cloud is available. In a fully self-contained configuration, monitoring device 202 has wifi capability and sends compressed environmental information 512 to the cloud 106. In an edge-device configuration, device 202 communicates with a nearby edge device, such as an edge device built into a case for device 202. This communication could be, for example, a low-power wireless protocol such as BLE (Bluetooth). The edge device then sends environmental information including compressed video and/or audio 512 to the cloud 106. For either method, the environmental information is also encrypted before it is sent to the cloud.

FIG. 5B shows a charging mode and a hotspot relay mode for a wireless relay charging case for the monitoring device. In a charging mode, device 202 rests in a case 510 that contains an internal power source 550 such as a battery. The device 202 can access power from the power source 550 in any number of appropriate manners, either through contact or by being plugged in. Case 510 also contains a wifi hotspot device 552 and a device facilitating Bluetooth communication with device 202. In hotspot/relay mode, device 202 sends captured environmental information (for example, stills, audio, metadata, and/or video from camera 210) to case 510, which then sends it to the cloud via hotspot 552.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 6:
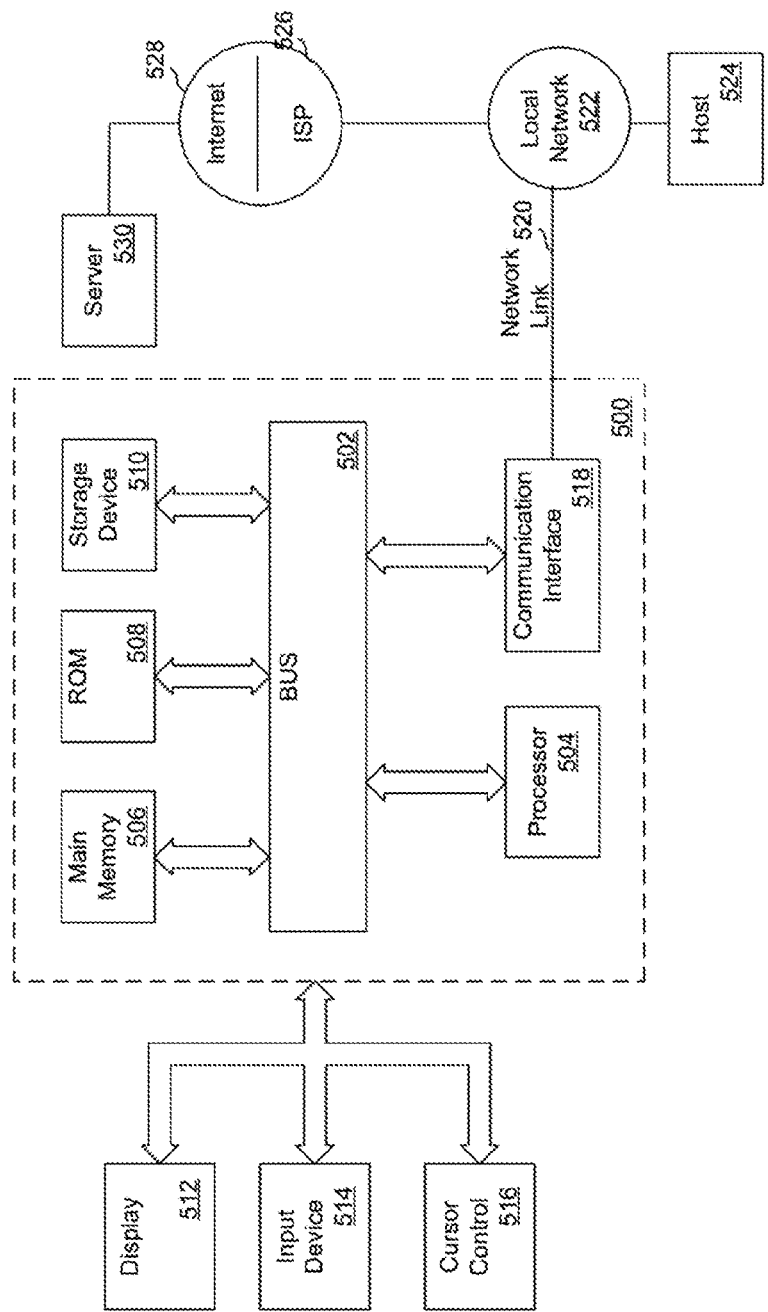
FIG. 6 illustrates a computer system that might be implemented as part of a monitoring device to perform operations described herein.

FIG. 6 is a block diagram that illustrates a computer system 500 upon which an embodiment of the invention may be implemented. Such a computer system may be part of cloud 106. The memory and processor 504 of such a system may be contained in monitoring device 202. Computer system 500 includes a bus 502 or other communication mechanism for communicating information, and a processor 504 coupled with bus 502 for processing information. Processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a computer monitor, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise but are not limited to non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that form bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network connection. A modem or network interface local to computer system 500 can receive the data. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Figure 7:
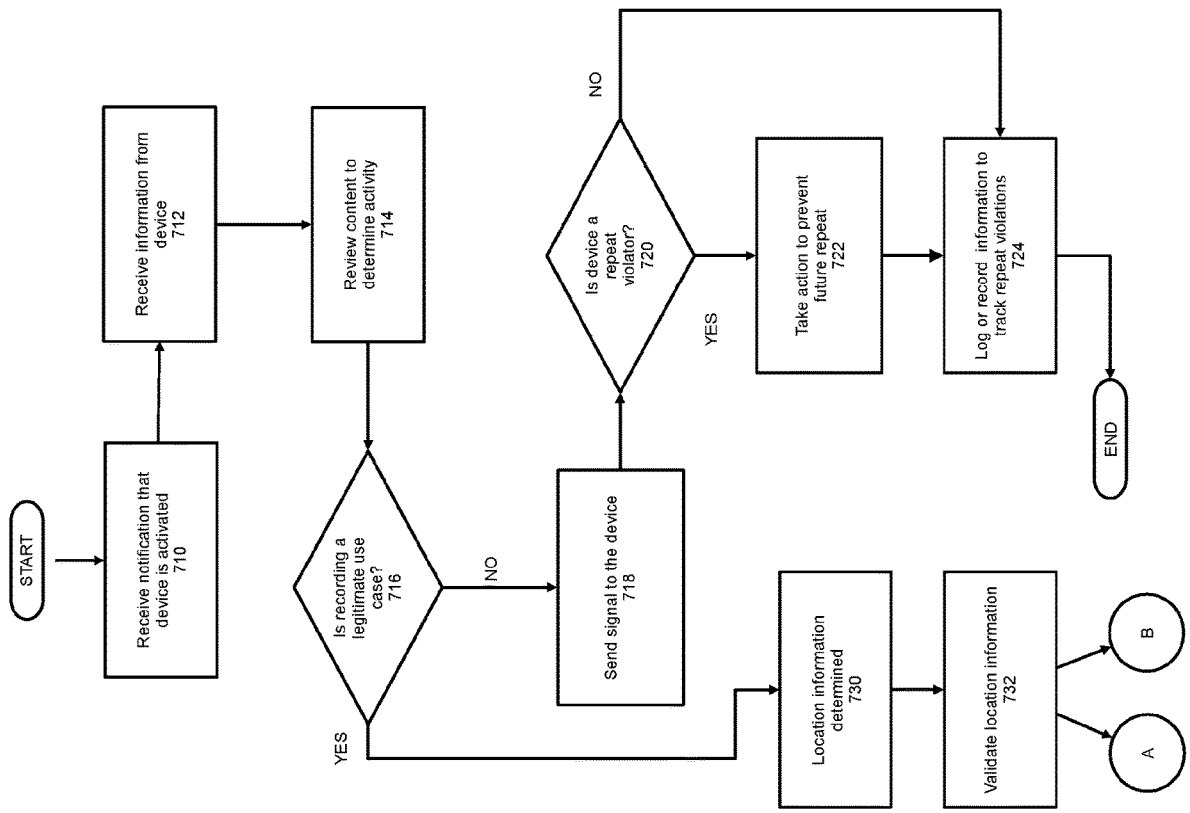
FIG. 7 shows a process for real-time moderation and monitoring of an activated device in accordance with the various aspects and embodiments of the invention.

Referring now to FIG. 7, a process is shown for real-time monitoring and moderation of a device that can capture environmental information. Given the device's ability to capture environmental information, there is often a mistrust or suspicion associated with using the device, which is a social problem caused by potential mis-use of the device. Accordingly, there is a monitoring and moderation process associated with the activation of the device to ensure appropriate/legitimate use of the device.

As the device becomes active, at step 710 a remote moderator receives a notification, which indicates that the device is activated. The device, when activated, can collect/capture information, send the information, and receive communication from a remote system. At step 712, the remote moderator receives information from the device. In accordance with some aspects of the invention, the information includes environmental information. At step 714, the remote moderator reviews the information to determine if the information includes a legitimate use of the device (for example, recording an arrest or interaction with a member of law enforcement) or if the device's use is a violation of user policies (for example, recording a private citizen without their knowledge or consent). The user may be required to consent to rules governing acceptable use before activating their device.

At step 716, if the information captured by the device violates any use policies or includes any inappropriate or illegitimate use, then at step 718 the remote moderator sends a signal to the device to interrupt the device's capturing of information. In accordance with some aspects of the invention, the signal deactivates or powers-down the device. In accordance with some aspects of the invention, the signal causes the device to stop capturing some environmental information while other information is captured. In accordance with some aspects of the invention, the signal causes the device to stop capturing all environmental information and return to a stand-by mode. At step 720, the system (or the remote moderator) searches a database of violators to determine if this device is a repeat offender. If so, then at step 722, further action is taken with respect to this device. In accordance with some aspects of the invention, the system may take action to prevent the device from being activated under similar situations, such as the same time and location. In accordance with some aspects of the invention, the system may take action that: disables the device, disables some features on the device, or indefinitely disables the device. In accordance with some aspects of the invention, the system may require the user to perform some action, such as logging into their account to: 1) read a notice that outlines violating activities; 2) pay a reactivation fee as a fine; and/or 3) receive information related to the violating activation of the device. In accordance with some aspects of the invention, the system sends a signal that erases any violating environmental information stored locally at the device. Then at step 724, the device information is logged and updated in the database of violators to indicate a repeat offender. In accordance with some aspects of the invention, the information updated in the database of violators includes time and location of the violation.

If at step 720, if it is determined that this device is a first time violator, then at step 724 the system logs or records the device's information in the database of violators. In accordance with some aspects of the invention, the logged/recorded information includes time and location of the violating activation event.

At step 716, if it is determined that the recording or activation event is a legitimate use or activation of the device, then at step 730 the location information is determined. At step 732, the system validates the location information. In accordance with some aspects of the invention, upon validation of the location information of a legitimate use case, various services are launched or activated, indicated as A and B.

Figure 8:
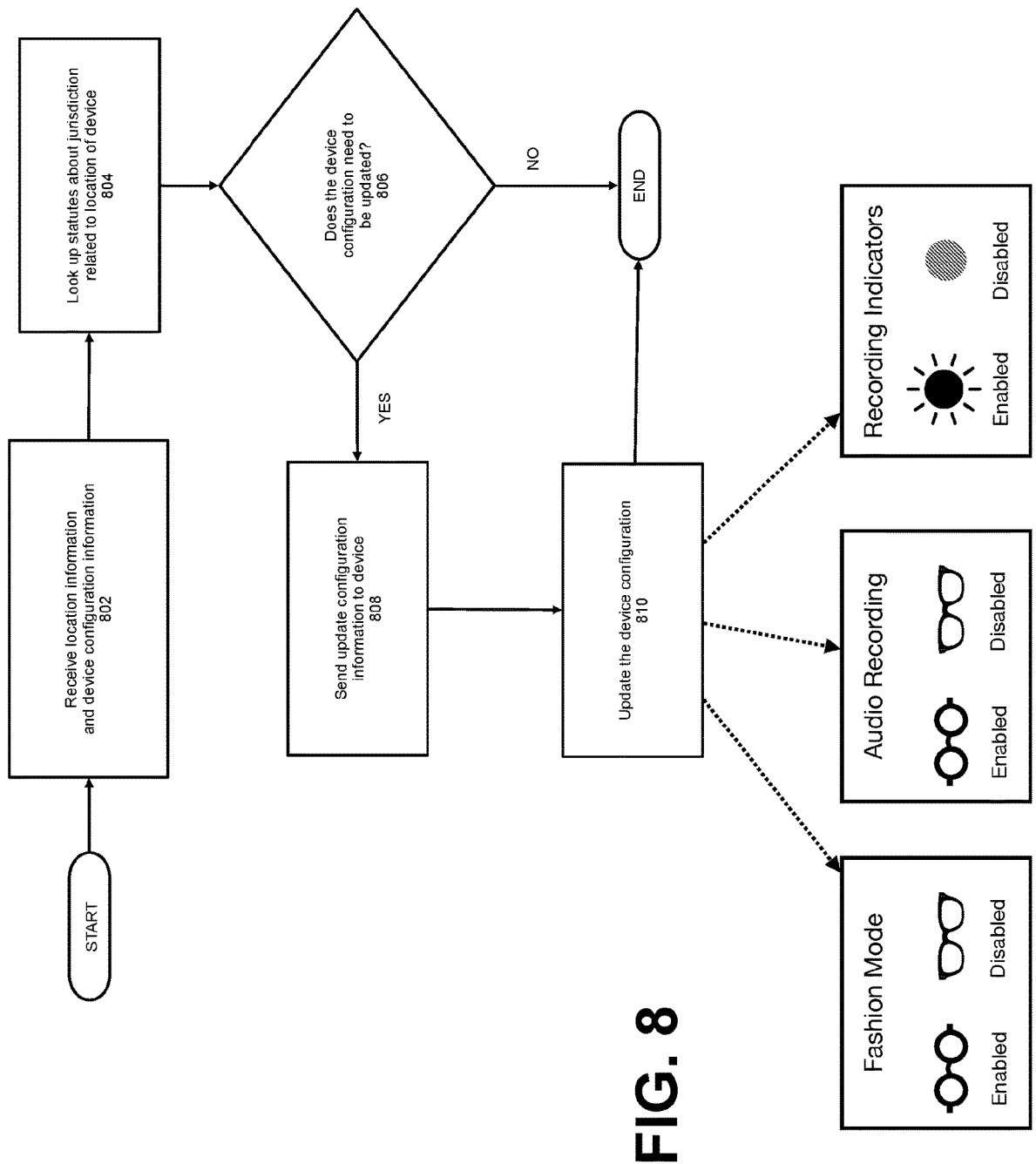
FIG. 8 shows a process for real-time compliance determination and configuration updates of an activated device in accordance with the various aspects and embodiments of the invention.

Referring now to FIG. 8, at step 802, the system receives location information and device configuration when the device is activated or turned-on. In accordance with some aspects of the invention, the location information includes city, state, and country. In accordance with some aspects of the invention, the location information is manually provided by the device's user. In accordance with some aspects of the invention, the location information is automatically captured by the device using cellular or GPS. At step 804, the system analyzes the location information to look up the local statutes associated with the location information of the device. The system compares the legal requirements, limits, and restrictions for capturing environmental information with the current environmental capturing mode/configuration of the device.

At step 806, the system determines if the configuration of the device needs to be updated in order to comply with local laws/statutes. If the device configuration needs to be updated, then at step 808 the system sends update configuration information to the device. As outlined herein, there are various embodiments of the device with different possible configurations. In accordance with some aspects of the invention, the device may have the fashion mode enabled or disabled. In accordance with some aspects of the invention, the device may have the audio recording mode enabled or disabled. In accordance with some aspects of the invention, the device may have the video recording mode enabled or disabled. At step 810 the device configuration information is updated so that the device can be configured in compliance with local laws.

Figure 9:
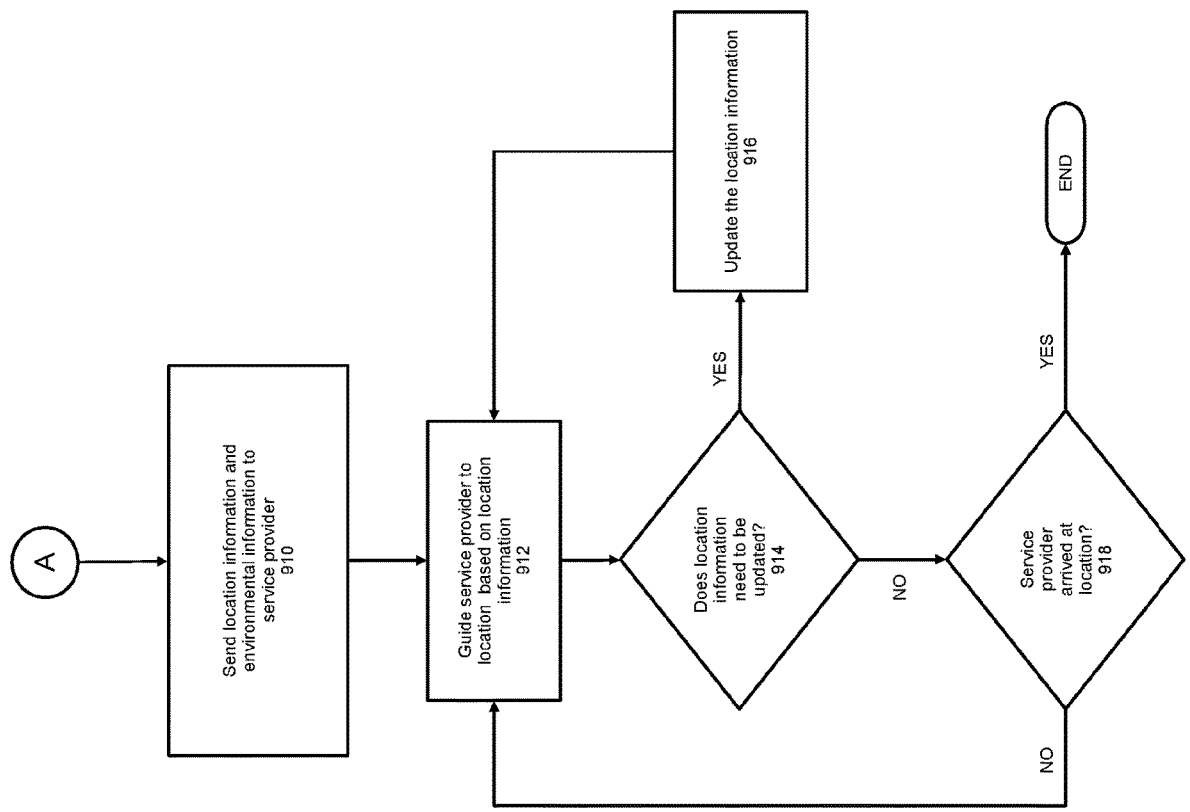
FIG. 9 shows a process for notification of and communication with service providers in accordance with the various aspects and embodiments of the invention.

Referring now to FIG. 9, a process is shown for alerting service providers in accordance with some aspects of the invention. As used herein, a service provider is any third party that is capable of rendering a service to the device's user. In accordance with some aspects of the invention, one example of a service provider is an attorney. In accordance with some aspects of the invention, the system maintains a database of service providers that can be contacted. The database or service providers can be stored locally or accessed from a remote location. In accordance with some aspects of the invention, the system can search for and find service providers, using the internet. The system uses the location information received from the device to identify nearby service providers.

At step 910, the system sends the location information and environmental information to the selected service provider(s). In accordance with some aspects of the invention, the system receives continuous or streaming environmental information from the device, such as live-video. In accordance with some aspects of the invention, the system receives instances of environmental information, such as a photo.

At step 912, the system provides guidance information to the service provider based on the location information from the device. The system continues to monitor for updates to the location information. At step 914 the system determines if the location information has changed and needs to be updated. If so, then at step 916, the system sends the updated location information to the service provider. In accordance with some aspects of the invention, the system may also provide any additional environmental information, which is received from the device, to the service provider.

At step 918 the system determines if the service provider has arrived at the location (or no longer wants/requires guidance information) that was identified in the location information. If the service provider has not arrived (or still wants/needs guidance information), then the process returns to step 912 and the system continues to provide guidance information. If the service provider has arrived at the location (or no longer wants/requires guidance information), then the process stops providing guidance information to the service provider.

Figure 10:
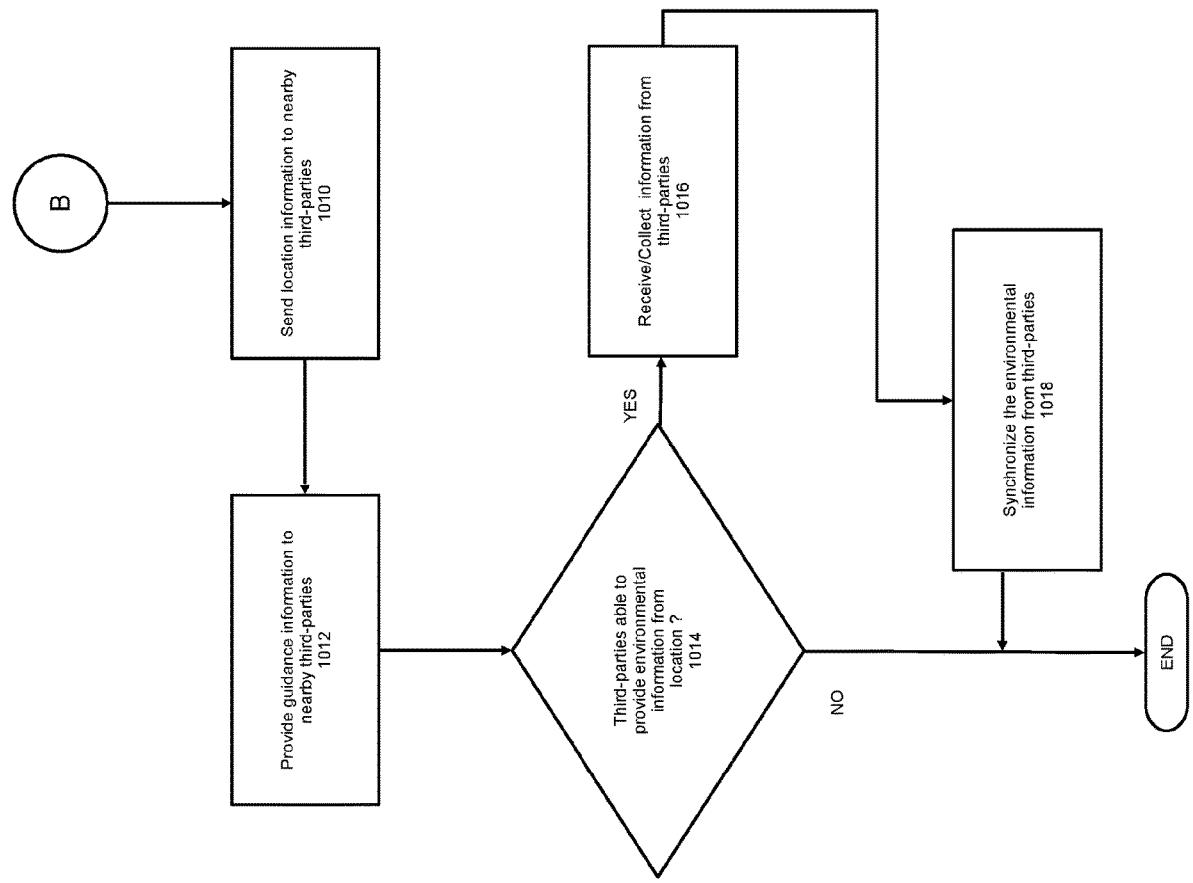
FIG. 10 shows a process for alerting nearby third-parties such as private citizens in accordance with the various aspects and embodiments of the invention.

Referring now to FIG. 10, a process is shown for notifying third-parties, such as private citizens who registered to provide support in times of distress, in accordance with some aspects of the invention. Once the device notifies the system that the device is activated, then at step 1010, the system uses the device's location information to identify nearby third-parties. In accordance with some aspects of the invention, the nearby third-parties are users/owners of a device, which is like the device that was activated. In accordance with some aspects of the invention, the nearby third-parties are individuals that have registered (with the system), for example, on their mobile phones, to be alerted when a nearby device is activated. At step 1012, the system provides guidance information to nearby third-parties. In accordance with some aspects of the invention, the system provides the guidance information through the third-parties device. In accordance with some aspects of the invention, the system provides the guidance information using a personal digital device that was registered with the system.

As the third party arrives at the location identified in the location information, the system determines, at step 1014, if the third-party's device is able to capture and send environmental information. If so, then at step 1016, the system receives and collects the environmental information from all third-party devices at the location. At step 1018, the system synchronizes the environmental information received from the third-party devices. This allows the system to collect information from multiple angles or perspectives to build an overall environmental information. In accordance with some aspects of the invention, the system uses time stamps to synchronize the collected third-party environmental information. In accordance with some aspects of the invention, the system uses content of the video, such as an object appearing in the video, to synchronize the collected third-party environmental information. In accordance with some aspects of the invention, the system uses audio information, such as the audio profile, to synchronize the collected third-party environmental information. In accordance with some aspects of the invention, the system uses time stamped images to synchronize the collected third-party environmental information. Once the environmental information is synchronized, the system can provide the information to the service provider as outlined with respect to FIG. 9 above.

Additional Variations

In one embodiment, monitoring device 202 might be in a passive state and then after the monitoring device detects a fall/impact, the monitoring device activates itself and switches to a monitoring state. In the monitoring state, the monitoring device might capture video, audio, images, metadata, etc. and store it locally or upload to a remote server in a manner that cannot be deleted from the monitoring device. This can be useful for cases where the wearer is restrained against a police vehicle, or restrained on the ground, where recording of events might be useful.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A monitoring system, comprising:
   a frame usable as facewear;
   a camera built into the frame for capturing environmental information when the camera is activated;
   an activation determiner for determining that the camera should be activated and for activating the camera;
   a movable cover, attached to the frame and the activation determiner, that conceals the camera when the camera is not activated and that is deployed to uncover the camera when the camera is activated;
   a memory to store the captured environmental information from the camera;
   at least one remote wearable camera;
   a removal detection element that detects when the frame is removed from a user's face; and
   an activation device connected to the removal detection element that activates the at least one remote wearable camera when the frame removal is detected.

2. The monitoring system of claim 1, further comprising:
   a communication connection to stream the stored environmental data to cloud storage when a wireless data capability is available.

3. The monitoring system of claim 1, wherein the activation determiner identifies an activation indication comprising at least one of: a gesture and an activation button press; and
   wherein the activation determiner activates the camera upon identification of the activation indication.

4. The monitoring system of claim 1, further comprising:
   a rear-mounted camera on the frame;
   a position recognizer that receives signals from at least one of the device and gestural input nodes attached to the user and recognizes that the user is lying down in a prone position; and
   wherein the position recognizer activates the rear-mounted camera when the gesture recognizer recognizes that the user is lying down in a prone position.

5. The monitoring system of claim 4, wherein the position recognizer identifies lying down in a prone position when the received signals indicate that the user's head and hands are on a horizontal plane and the user's head is oriented facing downwards.

6. The monitoring system of claim 1, further comprising the at least one remote wearable camera having a sleep mode;
a device disabled detection element in the remote camera that detects when the frame is powered off;
the activation device in the remote camera further configured to activate the at least one remote wearable camera when it is detected that the frame is powered off.

7. The monitoring system of claim 1, wherein the activation determiner activates the camera only if doing so is in accordance with laws of the jurisdiction where the monitoring device is located.

8. The monitoring system of claim 1, further comprising:
a location detector that detects a location of the monitoring device;
a local law detector that determines local law concerning camera use based on the location;
a disabling element that disables one of the following in accordance with the local law: camera, audio output of the camera.

9. The monitoring system of claim 1, further including two bands wearable by a user;
two activation elements attached to the respective bands; and
a communication circuit for communicating with the activation determiner on the frame when one of the activation elements is pressed, causing the activation determiner to activate the camera.

10. A monitoring system, comprising:
a frame usable as facewear;
a camera built into the frame for capturing environmental information when the camera is activated;
an activation determiner for determining that the camera should be activated and for activating the camera;
a movable cover, attached to the frame and the activation determiner, that conceals the camera when the camera is not activated and that is deployed to uncover the camera when the camera is activated;
a memory to store the captured environmental information from the camera;
at least one remote wearable camera in a sleep mode;
a device disabled detection element in the remote camera that detects when the frame is powered off;
an activation device in the remote camera that activates the at least one remote wearable camera when it is detected that the frame is powered off.

11. The monitoring system of claim 10, further comprising:
a communication connection to stream the stored environmental data to cloud storage when a wireless data capability is available.

12. The monitoring system of claim 10, wherein the activation determiner identifies an activation indication comprising at least one of: a gesture and an activation button press; and
wherein the activation determiner activates the camera upon identification of the activation indication.

13. The monitoring system of claim 10, further comprising:
a rear-mounted camera on the frame;
a position recognizer that receives signals from at least one of the device and gestural input nodes attached to the user and recognizes that the user is lying down in a prone position; and
wherein the position recognizer activates the rear-mounted camera when the gesture recognizer recognizes that the user is lying down in a prone position.

14. The monitoring system of claim 10, wherein the activation determiner activates the camera only if doing so is in accordance with laws of the jurisdiction where the monitoring device is located.

15. The monitoring system of claim 10, further comprising:
a location detector that detects a location of the monitoring device;
a local law detector that determines local law concerning camera use based on the location;
a disabling element that disables one of the following in accordance with the local law: camera, audio output of the camera.

16. The monitoring system of claim 10, further including two bands wearable by a user;
two activation elements attached to the respective bands; and
a communication circuit for communicating with the activation determiner on the frame when one of the activation elements is pressed, causing the activation determiner to activate the camera.

17. A hands-up detector system, comprising:
a base wearable on a hand or wrist of a user;
a motion detector attached to the base to detect motion of the user's hand;
a faceworn frame having a camera;
a gesture detecting element in the frame that communicates with the motion detector to detect a hands-up gesture of the user's hand based on the detected motion; and
an activation determiner in the frame for activating the camera when the hands-up gesture is detected.

18. The hands-up detector of claim 17, further comprising:
a second base wearable on a second hand of the user; and
a second motion detector attached to the second base to measure motion of the user's second hand;
wherein the gesture detecting element detects a double hands-up gesture of the first band and the second band based on the detected first motion and the detected second motion when both the first hands-up gesture and the second hands-up gesture are detected concurrently;
wherein the activation determiner activates the camera when the double hands-up gesture is detected.

19. The hands-up detector of claim 17, wherein the base is wearable on a wrist.

20. The hands-up detector of claim 17, wherein the base is wearable on a finger.

* * * * *